United States Patent
Gamon et al.

(10) Patent No.: US 10,217,058 B2
(45) Date of Patent: Feb. 26, 2019

(54) PREDICTING INTERESTING THINGS AND CONCEPTS IN CONTENT

(71) Applicant: MICROSOFT TECHNOLOGY LICENSING, LLC, Redmond, WA (US)

(72) Inventors: Michael Gamon, Bellevue, WA (US); Patrick Pantel, Seattle, WA (US); Arjun Mukherjee, Chicago, IL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1045 days.

(21) Appl. No.: 14/168,936

(22) Filed: Jan. 30, 2014

(65) Prior Publication Data

US 2015/0213361 A1    Jul. 30, 2015

(51) Int. Cl.
*G06N 99/00*    (2010.01)

(52) U.S. Cl.
CPC ................... *G06N 99/005* (2013.01)

(58) Field of Classification Search
None
See application file for complete search history.

(56) References Cited

U.S. PATENT DOCUMENTS

| | | | |
|---|---|---|---|
| 6,009,410 A * | 12/1999 | LeMole | G06Q 30/02 705/14.54 |
| 6,047,277 A | 4/2000 | Parry | |
| 7,810,035 B2 | 10/2010 | Dominowska et al. | |
| 8,019,763 B2 | 9/2011 | Wang | |
| 8,306,931 B1 | 11/2012 | Bowman et al. | |
| 8,412,648 B2 * | 4/2013 | Karypis | G06Q 10/04 706/12 |

(Continued)

FOREIGN PATENT DOCUMENTS

JP    2010020739 A    1/2010

OTHER PUBLICATIONS

Riccie, Francesco et al.; "Recommender Systems Handbook"; 2010; Springer; 847 pages.*

(Continued)

*Primary Examiner* — Stanley K. Hill
(74) *Attorney, Agent, or Firm* — Alleman Hall Creasman & Tuttle LLP

(57) ABSTRACT

An "Engagement Predictor" provides various techniques for predicting whether things and concepts (i.e., "nuggets") in content will be engaging or interesting to a user in arbitrary content being consumed by the user. More specifically, the Engagement Predictor provides a notion of interestingness, i.e., an interestingness score, of a nugget on a page that is grounded in observable behavior during content consumption. This interestingness score is determined by evaluating arbitrary documents using a learned transition model. Training of the transition model combines web browsing log data and latent semantic features in training data (i.e., source and destination documents) automatically derived by a Joint Topic Transition (JTT) Model. The interestingness scores are then used for highlighting one or more nuggets, inserting one or more hyperlinks relating to one or more nuggets, importing content relating to one or more nuggets, predicting user clicks, etc.

20 Claims, 7 Drawing Sheets

(56) References Cited

U.S. PATENT DOCUMENTS

| | | | |
|---|---|---|---|
| 8,429,106 B2 | 4/2013 | Downs et al. | |
| 8,504,583 B1 | 8/2013 | Ke et al. | |
| 8,615,514 B1* | 12/2013 | Fernandes | G06F 17/3089 707/728 |
| 8,694,511 B1* | 4/2014 | Corduneanu | G06F 17/30867 707/723 |
| 8,775,406 B2* | 7/2014 | Gross | G06F 17/30867 707/709 |
| 8,938,463 B1* | 1/2015 | Kim | G06F 17/30867 707/751 |
| 9,336,321 B1 | 5/2016 | Hayden | |
| 9,406,077 B1* | 8/2016 | Zhao | G06Q 30/0247 |
| 2007/0005646 A1* | 1/2007 | Dumais | G06F 17/30867 |
| 2007/0245035 A1* | 10/2007 | Attaran Rezaei | G06F 17/30864 709/238 |
| 2009/0210218 A1 | 8/2009 | Collobert | |
| 2011/0208768 A1 | 8/2011 | Mehanna | |
| 2011/0213655 A1* | 9/2011 | Henkin | G06Q 30/00 705/14.49 |
| 2011/0252027 A1 | 10/2011 | Chen et al. | |
| 2011/0302117 A1 | 12/2011 | Pinckney et al. | |
| 2012/0137201 A1 | 5/2012 | White et al. | |
| 2012/0253792 A1 | 10/2012 | Bespalov | |
| 2012/0254164 A1 | 10/2012 | Ide | |
| 2013/0036191 A1* | 2/2013 | Fink | G06F 17/30905 709/217 |
| 2013/0138589 A1 | 5/2013 | Yu et al. | |
| 2013/0204833 A1 | 8/2013 | Pang et al. | |
| 2013/0346182 A1* | 12/2013 | Cheng | G06Q 30/0242 705/14.41 |
| 2014/0006951 A1 | 1/2014 | Hunter | |
| 2014/0019443 A1 | 1/2014 | Goishan | |
| 2014/0236943 A1* | 8/2014 | Li | G06F 17/30699 707/736 |
| 2015/0363688 A1* | 12/2015 | Gao | G06N 3/04 706/27 |

OTHER PUBLICATIONS

Jin, et al., "A Unified Approach to Personalization Based on Probabilistic Latent Semantic Models of Web Usage and Content", In Proceedings of the AAAI Workshop on Semantic Web Personalization, Jul. 25, 2004, 9 pages.

Meteren, et al., "Using Content-Based Filtering for Recommendation", In Proceeding of Workshop on Machine Learning and New Information Age, May 30, 2000, 10 pages.

Bilenko, et al., "Mining the Search Trails of Surfing Crowds: Identifying Relevant Websites from user Activity", In Proceedings of 17th International World Wide Web Conference, Apr. 21, 2008, 10 pages.

Agichtein, et al., "Improving Web Search Ranking by Incorporating User Behavior Information", In Proceedings of the 29th Annual International ACM SIGIR Conference on Research and Development in Information Retrieval, Aug. 6, 2006, 8 pages.

Bandari, et al., "The Pulse of News in Social Media: Forecasting Popularity", In Proceedings of in 6th International Conference on Weblogs and Social Media, Jun. 04, 2012, 8 pages.

Bao, et al., "Optimizing Web Search using Social Annotations", In Proceedings of the 16th International Conference on World Wide Web, May 8, 2007, 10 pages.

Blei, et al., "Latent Dirichlet Allocation", In Journal of Machine Learning Research, vol. 3, Mar. 1, 2003, 30 pages.

Broder, et al., "A Semantic Approach to Contextual Advertising", In Proceedings of the 30th Annual International ACM SIGIR Conference on Research and Development in Information Retrieval, Jul. 23, 2007, 8 pages.

Buscher, et al., "Segment-Level Display Time as Implicit Feedback: A Comparison to Eye Tracking", In Proceedings of the 32nd International ACM SIGIR Conference on Research and Development in Information Retrieval, Jul. 19, 2009, 8 pages.

Chang, et al., "Connections between the Lines: Augmenting Social Networks with Text", In Proceedings of the 15th ACM SIGKDD International Conference on Knowledge Discovery and Data Mining, Jun. 28, 2009, 9 pages.

Chakrabarti, et al., "Contextual Advertising by Combining Relevance with Click Feedback", In 17th International Conference on World Wide Web, Apr. 21, 2008, 10 pages.

Chatterjee, et al., "Modeling the Clickstream: Implications for Web-Based Advertising Efforts", In Journal of Marketing Science, vol. 22, Issue 4, Oct. 15, 2003, 22 pages.

Chen, et al., "Leveraging Multi-Domain Prior Knowledge in Topic Models", In Proceedings of the Twenty-Third International Joint Conference on Artificial Intelligence, Aug. 3, 2013, 7 pages.

Chen, et al., "Position-Normalized Click Prediction in Search Advertising", In Proceedings of the 18th ACM SIGKDD International Conference on Knowledge Discovery and Data Mining, Aug. 12, 2012, 9 pages.

Cheng, et al., "Personalized Click Prediction in Sponsored Search", In Proceedings of the Third ACM International Conference on Web Search and Data Mining, Feb. 4, 2010, 9 pages.

Cheng, et al., "Multimedia Features for Click Prediction of New Ads in Display Advertising", In Proceedings of the 18th ACM SIGKDD International Conference on Knowledge Discovery and Data Mining, Aug. 12, 2012, 9 pages.

Craswell, et al., "An Experimental Comparison of Click Position-Bias Models", In Proceedings of the International Conference on Web Search and Data Mining, Feb. 11, 2008, 8 pages.

Dhillon, et al., "Concept Decompositions for Large Sparse Text Data Using Clustering", In Journal of Machine Learning, vol. 42, Issue 1-2, Jan. 2001, 31 pages.

Erosheva, et al., "Mixed Membership Models of Scientific Publications", In Proceedings of the National Academy of Sciences of the United States of America, vol. 101, Apr. 6, 2004, 13 pages.

Evans, et al., "An Elaborated Model of Social Search", In Journal of Information Processing and Management, vol. 46, Issue 6, Nov. 2010, 23 pages.

Farahat, et al., "How Effective is Targeted Advertising?", In Proceedings of the 21st International Conference on World Wide Web, Apr. 16, 2012, 10 pages.

Friedman, Jerome H., "Greedy Function Approximation: A Gradient Boosting Machine", In Proceedings of Annals of Statistics, vol. 29, Feb. 24, 1999, 39 pages.

Gao, et al., "Clickthrough-Based Latent Semantic Models for Web Search", In Proceedings of the 34th International ACM SIGIR Conference on Research and Development in Information Retrieval, Jul. 24, 2011, 10 pages.

Ghosh, et al., "Externalities in Online Advertising", In Proceedings of 17th International Conference on World Wide Web, Apr. 21, 2008, 8 pages.

Graepel, et al., "Web-Scale Bayesian Click-Through Rate Prediction for Sponsored Search Advertising in Microsoft's Bing Search Engine", In Proceedings of the 27th International Conference on Machine Learning, Jun. 21, 2010, 8 pages.

Granka, et al., "Eye-Tracking Analysis of User Behavior in WWW Search", In Proceedings of the 27th Annual International ACM SIGIR Conference on Research and Development in Information Retrieval, Jul. 25, 2004, 3 pages.

Griffiths, et al., "Finding Scientific Topics", In Proceedings of the National Academy of Sciences of the United States of America, vol. 101, Apr. 6, 2004, 8 pages.

Guo, et al., "Beyond Dwell Time: Estimating Document Relevance from Cursor Movements and other Post-click Searcher Behavior", In Proceedings of the 21st International Conference on World Wide Web, Apr. 16, 2012, 10 pages.

Guo, et al., "Click Chain Model in Web Search", In Proceedings of 18th International Conference on World Wide Web, Apr. 20, 2009, 10 pages.

Guo, et al., "Named Entity Recognition in Query", In Proceedings of the 32nd International ACM SIGIR Conference on Research and Development in Information Retrieval, Jul. 19, 2009, 8 pages.

(56) References Cited

OTHER PUBLICATIONS

Hillard, et al., "The Sum of its Parts: Reducing Sparsity in Click Estimation with Query Segments", In Journal of Information Retrieval, vol. 14, Issue 3, Jun. 2011, 30 pages.
Huang, et al., "Clustering Documents Using a Wikipedia-Based Concept Representation", In Proceedings of the 13th Pacific-Asia Conference on Advances in Knowledge Discovery and Data Mining, Apr. 27, 2009, 8 pages.
Joachims, Thorsten, "Optimizing Search Engines using Clickthrough Data", In Proceedings of the Eighth ACM SIGKDD International Conference on Knowledge Discovery and Data Mining, Jul. 23, 2002, 10 pages.
Joachims, et al., "Accurately Interpreting Clickthrough Data as Implicit Feedback", In Proceedings of the 28th Annual International ACM SIGIR Conference on Research and Development in Information Retrieval, Aug. 15, 2005, 8 pages.
Kelly, et al., "Display Time as Implicit Feedback: Understanding Task Effects", In Proceedings of the 27th Annual International ACM SIGIR Conference on Research and Development in Information Retrieval, Jul. 25, 2004, 8 pages.
Lacerda, et al., "Learning to Advertise", In Proceedings of the 29th Annual International ACM SIGIR Conference on Research and Development in Information Retrieval, Aug. 6, 2006, 8 pages.
Lerman, et al., "Using a Model of Social Dynamics to Predict Popularity of News", In Proceedings of 19th International Conference on World Wide Web, Apr. 26, 2010, 11 pages.
Lin, et al., "Active Objects: Actions for Entity-Centric Search", In Proceedings of 21st International Conference on World Wide Web, Apr. 16, 2012, 10 pages.
Maedche, et al., "Mining Ontologies from Text", In Proceedings of the 12th European Workshop on Knowledge Acquisition, Modeling and Management, Oct. 2, 2000, 14 pages.
McKeown, et al., "Tracking and Summarizing News on a Daily Basis with Columbia's Newsblaster", In Proceedings of the Second International Conference on Human Language Technology Research, Mar. 24, 2002, 6 pages.
McMahan, et al., "Ad Click Prediction: A View from the Trenches", In Proceedings of the 19th ACM SIGKDD International Conference on Knowledge Discovery and Data Mining, Aug. 11, 2013, 9 pages.
Metzler, et al., "Latent Concept Expansion using Markov Random Fields", In Proceedings of the 30th Annual International ACM SIGIR Conference on Research and Development in Information Retrieval, Jul. 23, 2007, 8 pages.
Morita, et al., "Information Filtering Based on User Behavior Analysis and Best Match Text Retrieval", In Proceedings of the 17th Annual International ACM SIGIR Conference on Research and Development in Information Retrieval, Aug. 1, 1994, 10 pages.
Okumura, et al., "Lexicon-to-Ontology Concept Association using a Bilingual Dictionary", In Proceedings of the First Conference of the Association for Machine Translation in the Americans, Oct. 1994, 8 pages.
Ramage, et al., "Clustering the Tagged Web", In Proceedings of the Second ACM International Conference on Web Search and Data Mining, Feb. 9, 2009, 10 pages.
Richardson, et al., "Predicting Clicks: Estimating the Click-Through Rate for New Ads", In Proceedings of the 16th International Conference on World Wide Web, May 8, 2007, 9 pages.
Sanderson, et al., "Deriving Concept Hierarchies from Text", In Proceedings of the 22nd Annual International ACM SIGIR Conference on Research and Development in Information Retrieval, Aug. 15, 1999, 8 pages.
Shen, et al., "Personalized Click Model Through Collaborative Filtering", In Proceedings of the Fifth ACM International Conference on Web Search and Data Mining, Feb. 8, 2012, 10 pages.
Szabo, et al., "Predicting the Popularity of Online Content", In Proceedings of the ACM of Magazine Communication, vol. 53, Issue 8, Aug. 1, 2010, 10 pages.
Wang, et al., "A Search-Based Method for Forecasting Ad Impression in Contextual Advertising", In Proceedings of 18th International Conference on World Wide Web, Apr. 20, 2009, 10 pages.
Wang, et al., "Joint Relevance and Freshness Learning from Clickthroughs for News Search", In Proceedings of 21st International Conference on World Wide Web, Apr. 16, 2012, 10 pages.
White, et al., "A Study on the Effects of Personalization and Task Information on Implicit Feedback Performance", In Proceedings of the 15th ACM International Conference on Information and Knowledge Management, Nov. 5, 2006, 10 pages.
Xiong, et al., "Relational Click Prediction for Sponsored Search", In Proceedings of the Fifth ACM International Conference on Web Search and Data Mining, Feb. 8, 2012, 10 pages.
Xu, et al., "Incorporating Revisiting Behaviors into Click Models", In Proceedings of the Fifth ACM International Conference on Web Search and Data Mining, Feb. 8, 2012, 9 pages.
Xu, et al., "Predicting Advertiser Bidding Behaviors in Sponsored Search by Rationality Modeling", In Proceedings of 22nd International Conference on World Wide Web, May 13, 2013, 11 pages.
Xu, et al., "Temporal Click Model for Sponsored Search", In Proceedings of the 33rd International ACM SIGIR Conference on Research and Development in Information Retrieval, Jul. 19, 2010, 8 pages.
Yang, et al., "Predicting Response to Political Blog Posts with Topic Models", In Proceedings of the Annual Conference of the North American Chapter of the Association for Computational Linguistics, May 31, 2009, 9 pages.
"International Search Report and Written Opinion Issued in PCT Application No. PCT/US2015/034994", dated Sep. 11, 2015, 10 Pages.
Chen, et al. "Deep Learning with Hierarchical Convolutional Factor Analysis", In Proceedings of the Transactions on Pattern Analysis and Machine Intelligence, vol. 35, No. 8, Aug. 1, 2013, 15 Pages.
Bengio, Yoshua, "Learning Deep Architectures for AI", In Journal Foundations and Trends® in Machine Learning, vol. 2, Issue 1, Jan. 2009, 130 pages.
Berger, et al., "Information Retrieval as Statistical Translation", In Proceedings of 22nd Annual International ACM SIGIR Conference on Research and Development in Information Retrieval, Aug. 15, 1999, pp. 222-229.
Bespalov, et al., "Sentiment Classification Based on Supervised Latent n-gram Analysis", Proceedings of the 20trh ACM International Conference on Information and Knowledge Management, 2011.
Brown, et al., "The Mathematics of Statistical Machine Translation: Parameter Estimation", In Journal of Computational Linguistics, vol. 19, Issue 2, Jun. 1993, 50 pages.
Burges, et al., "Learning to Rank Using Gradient Descent", In Proceedings of 22nd International Conference on Machine Learning, Aug. 7, 2005, pp. 89-96.
Chen, et al., "Semantic Smoothing and Fabrication of Phrase Pairs for SMT", In Proceedings of the International Workshop on Spoken Lanuage Translation, Dec. 8, 2011, 7 pages.
Collobert, et al., "Natural Language Processing (Almost) from Scratch", In Journal of Machine Learning Research, vol. 12, Aug. 2011, 45 pages.
Deerwester, et al., "Indexing by Latent Semantic Analysis", In Journal of the American Society for Information Science, vol. 41, Issue 6, Sep. 1990, pp. 391-407.
Deng, et al., "New Types of Deep Neural Network Learning for Speech Recognition and Related Applications: An Overview", In IEEE International Conference on Acoustics, Speech, and Signal Processing, May 2013, 5 pages.
Deng, et al., "A Deep Convolutional Neural Network Using Heterogeneous Pooling for Trading Acoustic Invariance with Phonetic Confusion", In IEEE International Conference on Acoustics, Speech, and Signal Processing, May 2013, 5 pages.
Dumais, et al., "Automatic Cross-Linguistic Information Retrieval using Latent Semantic Indexing", Published on: Jul. 22, 1996, Available at: http://citeseerx.ist.psu.edu/viewdoc/download?doi=10.1.1.54.5378&rep=rep1&type=pdf.
Gamon, et al., "Understanding Document Aboutness Step One: Identifying Salient Entities", In Microsoft Research Technical Report MSR-TR-2013-73, Nov. 2013, 21 pages.
Gao, et al., "Clickthrough-Based Translation Models for Web Search: From Word Models to Phrase Models", In Proceedings of

(56) References Cited

OTHER PUBLICATIONS the 19th ACM International Conference on Information and Knowledge Management, Oct. 26, 2010, pp. 1139-1148.
Gao, et al., "Smoothing Clickthrough Data for Web Search Ranking", In Proceedings of 32nd International ACM SIGIR Conference on Research and Development in Information Retrieval, Jul. 19, 2009, pp. 355-362.
Graves, et al., "Speech Recognition with Deep Recurrent Neural Networks", In Proceedings of Neural and Evolutionary Computing, Mar. 22, 2013, 5 pages.
Hinton, et al., "Deep Neural Networks for Acoustic Modeling in Speech Recognition", In IEEE Signal Processing Magazine, Nov. 2012, pp. 82-97.
Hinton, et al., "Discovering Binary Codes for Documents by Learning Deep Generative Models", In Topics in Cognitive Science, Apr. 7, 2014, 18 pages.
Hofmann, Thomas, "Probabilistic Latent Semantic Indexing", In Proceedings of 22nd Annual International ACM SIGIR Conference on Research and Development in Information Retrieval, Aug. 15, 1998, 8 pages.
Huang, et al., "Learning Deep Structured Semantic Models for Web Search using Clickthrough Data", In Proceedings of 22nd ACM International Conference on Information & Knowledge Management, Oct. 27, 2013, 6 pages.
Jarvelin, et al., "IR Evaluation Methods for Retrieving Highly Relevant Documents", In Proceedings of the 23rd Annual International ACM SIGIR Conference on Research and Development in Information Retrieval, Jul. 24, 2000, pp. 41-48.
Krizhevsky, et al., "ImageNet Classification with Deep Convolutional Neural Networks", In Advances in Neural Information Processing Systems, Dec. 3, 2012, 9 pages.
Kohonen, et al., "Self Organization of a Massive Document Collection", IEEE Transactions on Neural Networks, vol. 11, No. 3, May 2000.
Mikolov, et al., "Recurrent Neural Network Based Language Model", In Proceedings of 11th Annual Conference of the International Speech Communication Association, Sep. 26, 2010, 4 pages.
Paranjpe, Deepa, "Learning Document Aboutness from Implicit User Feedback and Document Structure", In Proceedings of the 18th ACM Conference on Information and Knowledge Management, Nov. 2, 2009, pp. 365-374.
Piwowarski, et al., "Predictive User Click Models Based on Clickthrough History", In Proceedings of the sixteenth ACM conference on Conference on information and knowledge management, Nov. 6, 2007, 9 pages.
Platt, et al., "Translingual Document Representations from Discriminative Projections", In Proceedings of Empirical Methods in Natural Language Processing, Oct. 9, 2010, 11 pages.
Robertson, et al., "The Probabilistic Relevance Framework: BM25 and Beyond", In Journal Foundations and Trends in Information Retrieval, vol. 3, Issue 4, Apr. 2009, 59 pages.
Singer, et al., "Memory and Structure in Human Navigation Patterns", In Proceedings of the Computing Research Repository, Feb. 2014, 27 pages.
Socher, et al., "Semantic Compositionality through Recursive Matrix-Vector Spaces", Semantic Compositionality through Recursive Matrix-Vector Spaces, Jul. 12, 2012, 11 pages.
Wu, et al., "Adapting Boosting for Information Retrieval Measures", In Journal of Information Retrieval, vol. 13, No. 3, Jun. 23, 2011, 17 pages.
Xu, et al., "Semantics-Based Personalized Prefetching to Improve Web Performance", In Proceedings of Conference on Distributed Computing Systems, Apr. 2000, 21 pages.
Yih, et al., "Learning Discriminative Projections for Text Similarity Measures", In Proceedings of 15th Conference on Computational Natural Language Learning, Jun. 23, 2011, 10 pages.
"International Preliminary Report on Patentability Issued in PCT Application No. PCT/US2015/034994", dated Sep. 21, 2016, 6 Pages.
"Second Written Opinion Issued in PCT Application No. PCT/US2015/034994", dated May 24, 2016, 5 Pages.
Lee, Tsu-Chang, U.S. Supp Notice of Allowance, U.S. Appl. No. 14/304,863, dated Nov. 16, 2017, pp. 1-2.
Lee, Tsu-Chang, U.S. Supp Notice of Allowance, U.S. Appl. No. 14/304,863, dated Sep. 21, 2017, pp. 1-3.
Lee, Tsu-Chang, U.S. Supp Notice of Allowance, U.S. Appl. No. 14/304,863, dated Sep. 9, 2017, pp. 1-3.
Lee, Tsu-Chang, U.S. Notice of Allowance, U.S. Appl. No. 14/304,863, dated Aug. 21, 2017, pp. 1-5.
Lee, Tsu-Chang, U.S. Final Office Action, U.S. Appl. No. 14/304,863, dated May 4, 2017, pp. 1-11.
Lee, Tsu-Chang, U.S. Office Action, U.S. Appl. No. 14/304,863, dated Oct. 19, 2016, pp. 1-23.

* cited by examiner

PREDICTING INTERESTING THINGS AND CONCEPTS IN CONTENT

BACKGROUND

Many conventional click modeling techniques attempt to interpret the users' click data in order to predict their clicking behavior. Click prediction models used for this purpose are typically built using click-through logs of large numbers of users collected from search engines. Such models are often used for applications such as web search ranking, ad click-through rate (CTR) prediction, personalized click-based recommendation systems, etc.

One of the main foci of click prediction models is query based click prediction which attempts to compute the probability that a given document in a search-result page is clicked on after a user enters some query. The intent of such techniques is generally to learn user-perceived relevance for query-document pairs. In most click prediction models, dwell time is used as an intrinsic relevance signal. Other factors that are often considered include the position bias problem (where links having higher or more prominent positions on a page are generally more likely to be clicked on, even if such links tend to be less relevant to the user), revisiting behaviors, post-click behaviors, freshness for news searches, etc.

Click prediction models are frequently used for online advertising and sponsored searches (i.e., search results with recommended ads). In such cases, ads are typically ranked according to their likelihood of being relevant to the user and their likelihood of generating high revenue, which are highly correlated with the probability of a user click. Consequently, accurate click prediction is highly correlated to the success of sponsored searches and ad placements. Modeling approaches used for such purposes include ad click prediction using historical CTR and references therein, using ads related to content of documents being viewed by the user, exploiting mutual influence between ads, relation click prediction for multiple ads on a page, modeling positional bias in sponsored searches, using multimedia features in ad click prediction, etc. Related approaches use personalized click models that combine user CTR and browsing metadata (e.g., demographics) to improve personalized and sponsored search. Unfortunately, since such methods tend to rely on ad query and query augmented metadata, the techniques used in ad click prediction and sponsored search are not directly applicable to determining what a user will be interested in relative to arbitrary documents.

Similarly, contextual advertising places ads within the content of generic third party web pages. This type of placement is usually performed by some commercial intermediary (ad-network) which attempt to optimize ad selection in a manner that both increases ad revenue and improves user experience. Various studies have shown that the success of such techniques is closely related to accurate click prediction. Ad representation with word/phrase vectors has also been shown to work well. Various extensions to such techniques include the use of models that combine click feedback, forecasting ad-impressions, etc. Unfortunately, these types of models tend to rely on matching page content with the subject of the ad, and are thus unable to predict browsing transitions from arbitrary pages.

The majority of the click prediction techniques summarized above employ probabilistic models based on historical CTR. A related approach employs statistical machine translation to learn semantic translation of queries to document titles. Similarly, another related approach uses probabilistic models for discovering entity classes from query logs to identify latent intents in entity centric searches. Unfortunately, such models apply to individual page/query pairs and associated metadata and are thus unable to predict browsing transitions from arbitrary pages.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, an "Engagement Predictor," as described herein, provides various techniques for predicting whether things and concepts automatically identified in the content of arbitrary documents (e.g., text, documents, spreadsheets, images, etc.) will be sufficiently engaging or interesting to a user that the user is likely to investigate or follow links to related things or content. In various embodiments, the Engagement Predictor uses high-level semantic concept mappings automatically extracted or learned from contents of multiple documents (or other content) to construct various models. These models are then applied to arbitrary content being consumed (i.e., reading, viewing, and/or listening to) by the user to predict transitions to other things and concepts (or other content) that will likely be of interest to the user.

More specifically, in various embodiments, the Engagement Predictor operates by receiving a collection of data points representing transitions between pairs of source content and destination content. The Engagement Predictor then extracts a plurality of features from each source content and each destination content. The extracted features are then used to train a transition model that statistically explains why the transitions were made. The trained transition model is then applied to arbitrary documents to predict transitions to other content that will likely be of interest to the user.

Note that the things and concepts (e.g., words, names, dates, places, topics, images, etc.) likely to be of interest to the user are collectively referred to herein as "interesting nuggets," or simply "nuggets." In general, every word, phrase, sentence, image, or any other element of any content can be considered as a nugget for purposes of determining whether that nugget will be of interest to the user. Note also that the term "interestingness" is defined herein as a computed score or statistical measure relating to the likelihood that the user will be interested in pursuing, consuming, or transitioning to content related to one or more interesting nuggets that are automatically identified in an arbitrary document being consumed by the user. As such, nuggets having a level of interestingness exceeding some threshold level can be used as the basis to augment content being consumed by the user.

In various embodiments, the Engagement Predictor also considers the context of how or what the user is doing as the user is consuming particular content. In other words, while consuming content, the user may be interested in learning more about some nugget in the current context of that content consumption. This interest leads to an observable user action or context, which can take many different forms. For example, the user might issue a query to a search engine, consult a printed reference such as a dictionary, consult with friends over a social network, or (in web content consumption) click on an anchor (i.e., a hyperlink) on the current page or document. All these observable user actions can be used as contextual indications that the user shows interest in the given nugget.

Advantageously, in contrast to conventional modeling techniques, the models constructed by the Engagement Predictor are created without relying on prior browsing history or click logs relating to the particular documents being consumed by the user. Consequently, the Engagement Predictor is capable of predicting interestingness in situations where there is little or no history relating to a particular document. More specifically, while the Engagement Predictor can use web usage data (e.g., user interaction logs) for model training, the Engagement Predictor provides various solutions for the general use case where at run-time (i.e., after model training) there is no access to historical data (e.g., browsing history, click logs, etc.). Consequently, the trained models allow the Engagement Predictor to predict interestingness based on the models alone without needing to consider information such as browsing history or click logs for determining interestingness relative to content being consumed by the user.

In other words, the Engagement Predictor is capable of learning notions of interestingness to construct models from a combined evaluation of document semantic content (or automatically learned latent semantic content) and browser page (or other document) transition click logs (e.g., web browser log data) for large numbers of documents. These models are then applied to the content of arbitrary source documents to identify one or more interesting nuggets in the arbitrary document that are likely to be of interest to a user that is consuming content within that arbitrary document, without also requiring the Engagement Predictor to consider browsing history or click logs for the content of the arbitrary source documents.

The capability of the Engagement Predictor to predict what is interesting in the context of arbitrary content in arbitrary documents enables a wide range of applications. For example, the Engagement Predictor can enrich or augment the content consumption experience for a user by providing augmentation of document content. In other words, interesting nuggets automatically identified in an arbitrary document (i.e., a "source document") can be highlighted, augmented with new or additional links to one or more destination documents, or used as the basis to import additional interesting content and/or advertisements that are either incorporated into that arbitrary document or displayed in conjunction with that arbitrary document. In addition to augmenting content, knowing what is of interest to the user allows the Engagement Predictor to learn profiles for individual users that can then be used to enhance or personalize user experience in a wide range of applications employed by the user (e.g., browsers, word processing applications, etc.).

One simple example of these concepts is that the Engagement Predictor provides the capability to automatically turn one or more interesting nuggets in an arbitrary document into anchors which link to another document (e.g., a URL or other document source) with relevant information. This kind of augmentation invites the user to explore interesting avenues from the current document without cluttering that content with uninteresting anchors.

For example, during content consumption the user may decide to investigate a particular interesting nugget further. Sometimes this behavior leads to the exploration of a single nugget (e.g., clicking on a single link added or highlighted by the Engagement Predictor to transition to a related document or other content). Similarly, the user may sometimes follow a lengthy chain of interesting nuggets leading from one document to another. For example, the user might consume content about an actress and her recent and successful TV series. They might then click on a link added or highlighted by the Engagement Predictor to a biography of the actress, where they might find existing links (or links added or highlighted by the Engagement Predictor) to other TV shows that now pique their interest.

In general, the notion of interestingness is not a static concept. What is perceived as interesting in the context of some specific content depends on the current content (source), the content of a destination document, and potentially, the particular user consuming the source and destination document. Note that a particular nugget in one document that may be interesting to many readers may not be of interest to readers of a different document. For example, given the previous example of a popular actress who is mentioned in a document about her latest successful TV series, users might find it interesting to follow up on her in this context, while the same actress mentioned in a document about actors who have worked for a specific film studio in the 1990's might elicit less of an interest from a general audience. Similarly, content about the actress and her acting career might be of higher interest than content about her clothing line.

From a purely text content based perspective, identifying interesting and uninteresting nuggets (by determining relative scores or levels of interestingness) in a document is useful for a wide range of purposes, including, but not limited to, improving concept decomposition for large scale text clustering, building improved concept dictionaries/associations and concept ontologies, etc. Within a web context, characterization of interesting concepts or anchors (i.e., nuggets) in a page (or other document) is useful for a wide range of purposes, including, but not limited to, implementing applications involving concept clustering and representation, building concept hierarchies, latent concept expansion, tagged web clustering, etc. Further, since discovering interesting anchors or nuggets enables the Engagement Predictor to perform automated web page (or other document) annotation/augmentation with additional metadata, the discovery of interesting nuggets in content holds promise for various downstream tasks like improved web search relevance, topic-link based document retrieval using language models, improved information presentation or augmentation for browsing, etc.

In view of the above summary, it is clear that the Engagement Predictor described herein provides various techniques for predicting whether interesting nuggets in content will be sufficiently engaging or interesting to a user that the user is likely to investigate or follow links to related things or content. In addition to the just described benefits, other advantages of the Engagement Predictor will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
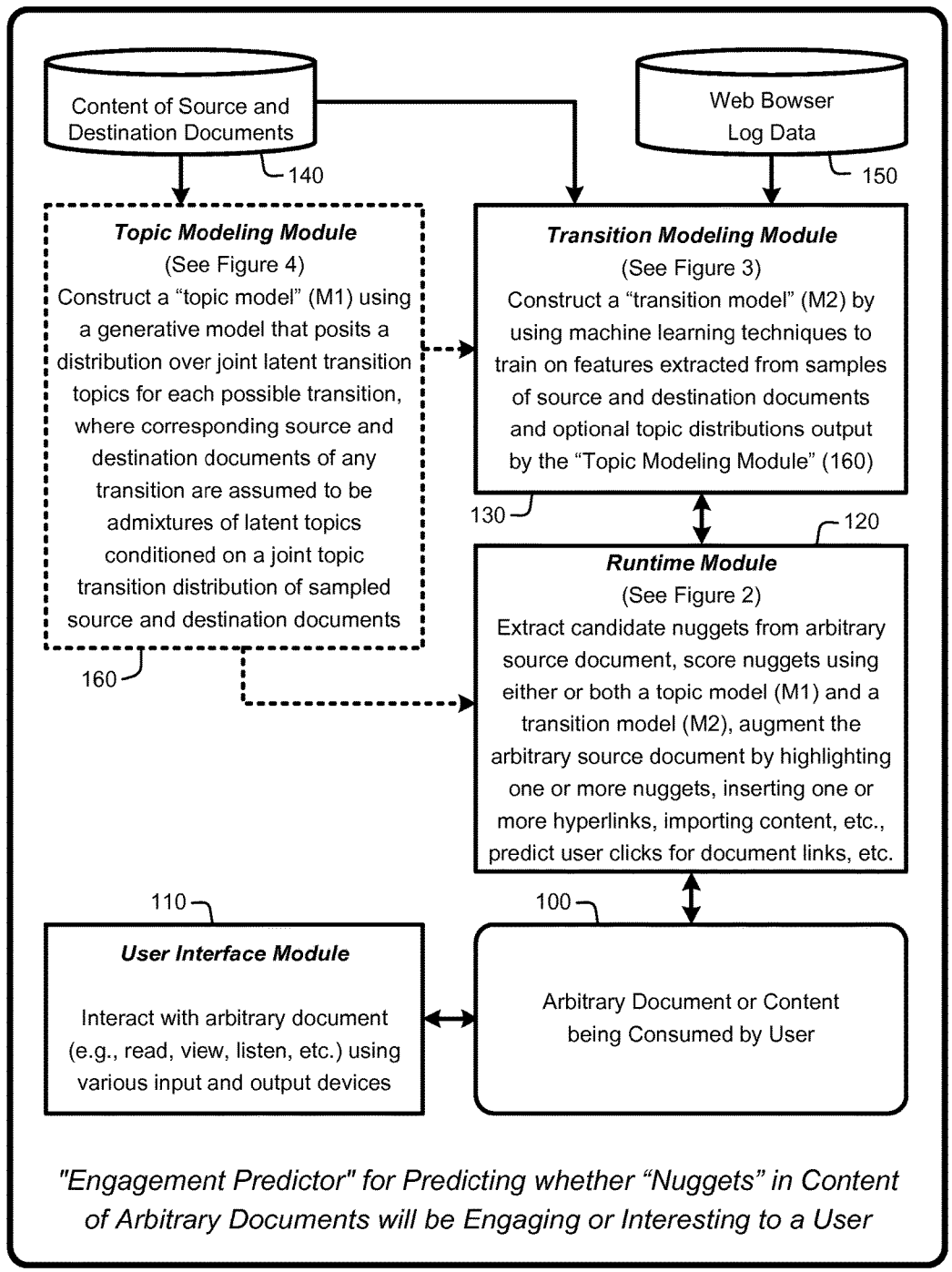
FIG. 1 provides an exemplary architectural flow diagram that illustrates program modules for implementing an "Engagement Predictor" for use in predicting whether "nuggets" in the content of arbitrary documents will be engaging or interesting to a user, as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, an "Engagement Predictor," as described herein, provides various techniques for predicting whether things and concepts (e.g., words, names, dates, places, topics, images, etc.) in the content of arbitrary source documents (e.g., text, documents, spreadsheets, images, etc.) being consumed by the user will be sufficiently engaging or interesting to a user that the user is likely to investigate or follow links to related things or content. More specifically, given a set of pairs of source and destination documents, the Engagement Predictor evaluates transitions between those source and destinations to learn features that statistically explain reasons why the transitions were made. The learned features are then used to train a model for that can then predict for arbitrary source and destination document pairs if the destination document (or some portion of that document) is likely to be of interest to a user consuming content in the arbitrary source document.

Note that the concept of "content" being "consumed" by the user is intended to mean any content in any document that is being read, viewed, and/or listened to by the user. Further, the things and concepts (and various combinations of these things and concepts) likely to be of interest to the user are collectively referred to herein as "interesting nuggets," or simply "nuggets." In general, every word, phrase, sentence, image, hyperlink, or any other element of any content can be considered as a nugget for purposes of determining whether that nugget will be of interest to the user.

Note also that the term "interestingness" is defined herein as a computed score or statistical measure relating to the likelihood that the user will be interested in pursuing, consuming, or transitioning to content related to one or more interesting nuggets that are automatically identified in an arbitrary document being consumed by the user. As such, nuggets having a level of interestingness exceeding some threshold level (i.e., the nugget is sufficiently interesting that the user is likely to transition to related content) can be used as the basis to augment content being consumed by the user. In addition to augmenting content, knowing what is of interest to the user allows the Engagement Predictor to learn profiles for individual users that can then be used to enhance or personalize user experience in a wide range of applications employed by the user (e.g., browsers, word processing applications, etc.).

Note that the term "transition" as used herein is defined as meaning clicking through from one document to another, or some other way that specifies an interest in a particular destination document in view of a particular source document (e.g., change to playing a related song (i.e., destination content) after playing a first song (i.e., source content).

Further, the term "feature" or "features" as it relates to information extracted from source and destination documents, is specifically defined herein to include general feature categories, including, but not limited to, geotemporal features, nugget features, explicit semantic features inherent in the documents, latent semantic features derived from an unsupervised joint topic model (i.e., the aforementioned latent semantic topics derived from documents), etc. Note that features and feature categories are discussed in further detail in Section 2.4.2.

Note also that while the Engagement Predictor is generally described herein in terms of evaluating content being currently consumed by the user, the Engagement Predictor is fully capable of evaluating individual documents or entire libraries of documents or content whether or not those documents or content are being currently consumed by the user. The resulting evaluation can then be used to determine likely user interest, and then act on that interest to modify or augment the documents, as described herein, before any such documents are presented to the user.

In operation, the Engagement Predictor first learns one or more models, which generally describe notions of interestingness, from an evaluation of document content and browser page transition click logs for large numbers of documents. These models are then applied to the content of arbitrary source documents to identify one or more interesting nuggets in the arbitrary document that are likely to be of interest to a user that is consuming content within that arbitrary document.

The resulting interesting nuggets can then be augmented with new or additional links to one or more destination documents, highlighted, or used as the basis to import additional content and/or advertisements expected to be of interest to the user into that arbitrary document. Note that in the case that additional content is incorporated into the arbitrary document, or displayed in conjunction with that document, any of a number of automated formatting techniques can be used to present that additional content to the user. Such automated formatting techniques are generally well known to those skilled in the art, and will not be described in detail herein.

1.1 System Overview:

As noted above, the Engagement Predictor provides various techniques for predicting whether interesting nuggets automatically identified in arbitrary content will be sufficiently engaging or interesting to a user that the user is likely to investigate or follow links to related things or content. The processes summarized above are illustrated by the general architectural flow diagrams of FIG. 1 through FIG. 5. In particular, the architectural flow diagrams of FIG. 1 through FIG. 5 illustrate the interrelationships between program modules for implementing various embodiments of the Engagement Predictor, as described herein. Furthermore, while the architectural flow diagrams of FIG. 1 through FIG. 5 illustrate high-level views of various embodiments of the Engagement Predictor, these figures are not intended to provide an exhaustive or complete illustration of every possible embodiment of the Engagement Predictor as described throughout this document.

In addition, it should be noted that any boxes and interconnections between boxes that may be represented by broken or dashed lines in any of FIG. 1 through FIG. 5 represent alternate embodiments of the Engagement Predictor described herein, and that any or all of these alternate embodiments, as described below, may be used in combination with other alternate embodiments that are described throughout this document.

In general, as illustrated by FIG. 1, the processes enabled by the Engagement Predictor begin operation by providing an arbitrary document 100 or other content being consumed by the user (via a user interface module 110) to a runtime module 120. As noted above, the arbitrary document being consumed by the user can be any content, including, but not limited to, text, documents, spreadsheets, images, audio, etc. Consumption of the arbitrary document via the user interface module 110 includes any of a wide range of document interactions, including, but not limited to, reading the document, viewing the document, editing the document, listening to the document (e.g., music, news, audiobooks, etc.), or any other interaction with the document using any of a wide variety of input and output devices.

The runtime module 120 generally operates by evaluating the arbitrary document 100 and extracting candidate nuggets from the arbitrary source document. The runtime module then computes interestingness scores for each of the candidate nuggets using either or both a topic model (see topic modeling module 160) and a transition model (see transition modeling module 130). The runtime module 120 then augments the arbitrary document 100 by highlighting one or more nuggets, inserting one or more hyperlinks relating to one or more nuggets, importing content relating to one or more nuggets, etc., predicting clicks for one or more document links, etc. Note that the runtime module 120 is described in further detail below with respect to FIG. 2.

The aforementioned transition modeling module 130 generally operates to construct a "transition model" (also referred to herein as model "M2") by using various machine learning techniques to train on features (see Section 2.4.2) extracted from the content 140 of large samples of source and destination documents as well as web browser log data 150 (e.g., click data, search logs, etc.) that is joined against the source and destination documents to capture instances where a user transitioned from one document or page to another in the training data. The transition modeling module 130 also trains on latent semantic topic distributions derived by the topic modeling module 160 from the content 140 of large samples of source and destination documents. Note that the transition modeling module 130 is described in further detail below with respect to FIG. 3.

In addition, it should also be understood that the features extracted by the transition modeling model 130 may also include explicit topic or category information if such information is explicit within any of the source and destination documents. Further, this explicit topic or category information can be used by the transition modeling model 130 for training of the transition model, either in place of the latent semantic topic distributions derived by the topic modeling module 160, or in addition to the latent semantic topic distributions.

The aforementioned topic modeling module 160 uses a Joint Transition Topic (JTT) Model that operates to construct a "topic model" by evaluating the content 140 of large samples of source and destination documents using a generative model that posits a distribution over joint latent transition topics (as a higher level semantic space) for each possible transition of that content. In this evaluation, corresponding source and destination documents of any transition are assumed to be admixtures of latent topics conditioned on a joint topic transition distribution of the content 140 of the sampled source and destination documents. In other words, as discussed in further detail throughout Section 2.5, the topic modeling module 160 learns latent semantic topics from source and destination documents without directly considering any topic data or categorization information, if it exists at all, in any of the source and destination documents used as training data. Note that the topic modeling module 160 is described in further detail below with respect to FIG. 4.

Figure 2:
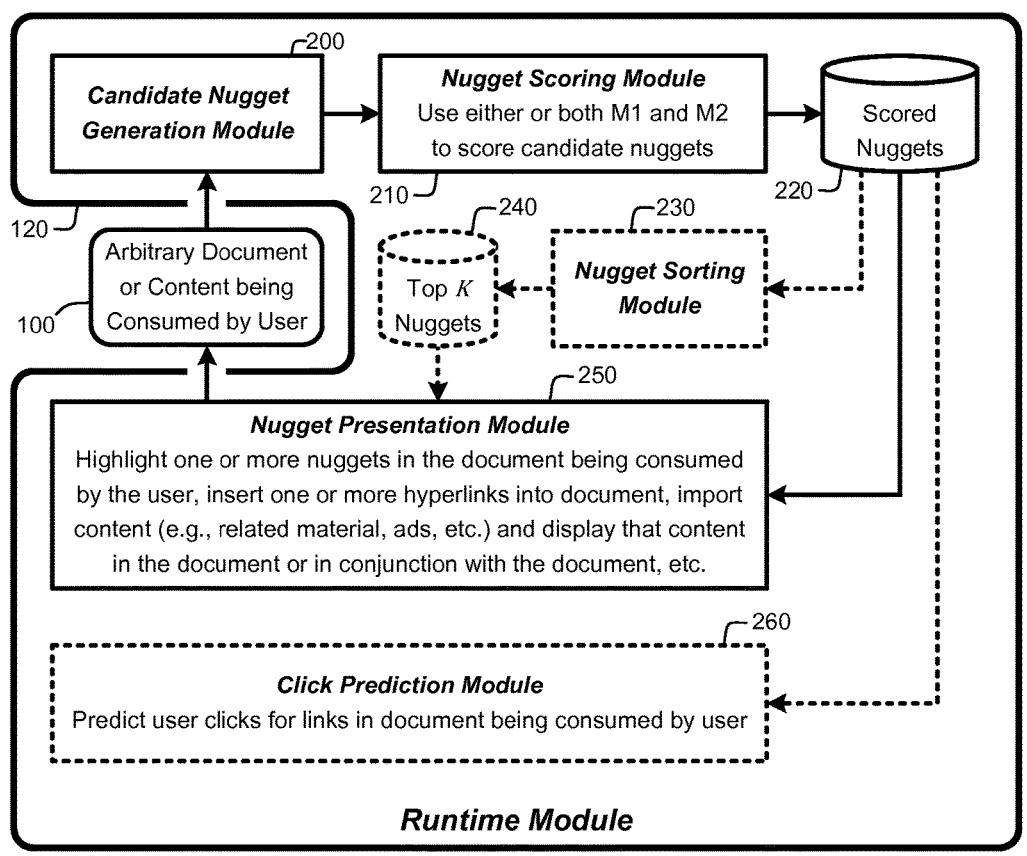
FIG. 2 provides an exemplary architectural flow diagram that illustrates program modules for implementing the "runtime module" of the "Engagement Predictor" shown in FIG. 1, as described herein.

Referring now to FIG. 2, this figure provides an exemplary architectural flow diagram that illustrates program modules for implementing the "runtime module" 120 of the "Engagement Predictor" shown in FIG. 1. In particular, the runtime module 120 generally operates by using a candidate nugget generation module 200 to extract a set of candidate nuggets from the contents of the arbitrary document 100 or other content being consumed by the user. As noted above, every word, phrase, sentence, image, hyperlink, or any other element of any content can be considered as a candidate nugget for purposes of determining whether that nugget will be of interest to the user.

The set of candidate nuggets extracted from the arbitrary document 100 or other content being consumed by the user is then passed to a nugget scoring module 210. The nugget scoring module then uses either or both the previously trained topic model (M1) and the transition model (M2) to compute interestingness scores for each of the candidate nuggets. The result of this scoring process is a set of scored nuggets 220. Note that since the models used to evaluate the candidate nuggets have been previously trained, computing interestingness scores for each of the candidate nuggets is performed in near real-time given typical computational resources on whatever computational device is being used by the user to consume the arbitrary document 100 or other content. In various embodiments, a nugget sorting module 230 then sorts the scored nuggets in order of interestingness score to produce a set of top K nuggets 240 having the highest interestingness scores.

In either case, whether or not the nuggets are sorted, a nugget presentation module 250 then augments the arbitrary document 100 or other content being consumed by the user. Advantageously, since the interestingness scoring is accomplished in near real-time, as noted above, this augmentation process is also performed in near real-time, with little or no delay that will be noticeable by the user. In general, as discussed throughout this document, augmentation of the arbitrary document 100 or other content being consumed by the user includes, but is not limited to highlighting one or more nuggets in the document, inserting one or more hyperlinks into document, importing content (e.g., related material, ads, etc.) and then displaying that imported content either in the document or in conjunction with the document, etc.

In addition, in various embodiments, a click prediction module 260 is used to predict which link or anchor in the arbitrary document 100 will be clicked on next by the user. While interestingness scores can be used for this purpose, computation of interestingness scores by the nugget scoring module 210 for click prediction is performed in a slightly different manner than computation of interestingness scores for nuggets in general. In particular, while the same transition model is used for this purpose, slightly different information is presented to the transition model. Specific details of interestingness scoring for click prediction are discussed below in Section 2.6.2.

Figure 3:
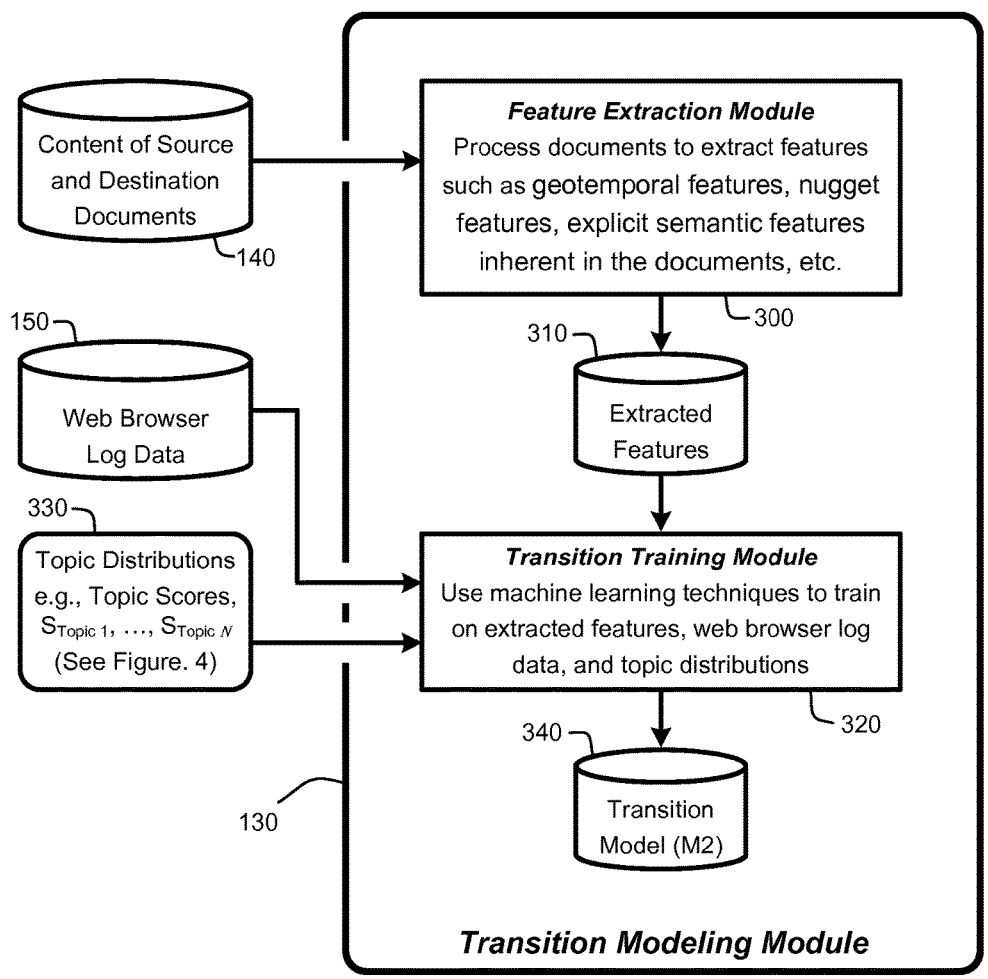
FIG. 3 provides an exemplary architectural flow diagram that illustrates program modules for implementing the "transition modeling module" of the "Engagement Predictor" shown in FIG. 1, as described herein.

Referring now to FIG. 3, this figure provides an exemplary architectural flow diagram that illustrates program modules for implementing the "transition modeling module" of the "Engagement Predictor" shown in FIG. 1. In general, as noted above, the transition modeling module 130 uses machine learning techniques to generate the aforementioned transition model 340 from training data. More specifically, training begins by using a feature extraction module 300 to extract features from the contents of the source and destination documents 140 used for training. As discussed in further detail in Section 2.4.2, examples of features extracted by the feature extraction module 300 include, but are not limited to, geotemporal features, nugget features, explicit semantic features inherent in the documents, etc.

Figure 4:
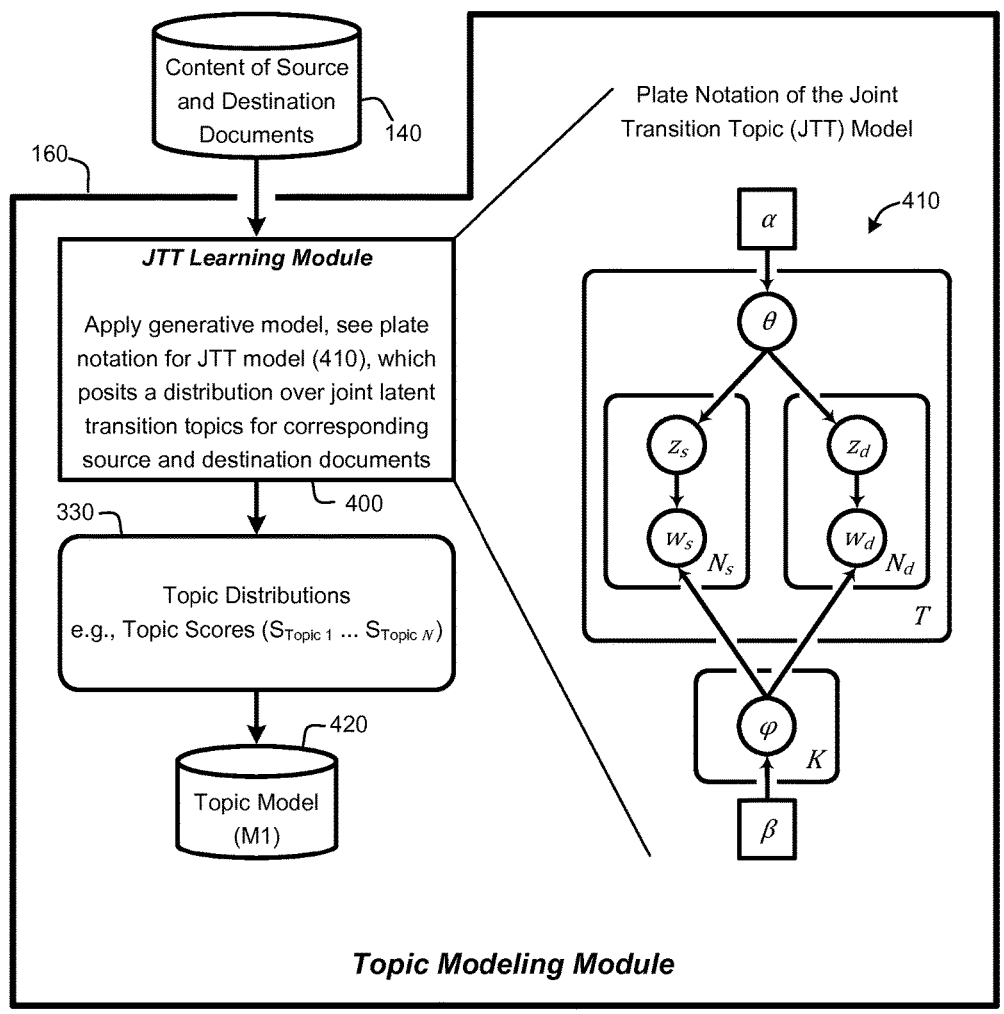
FIG. 4 provides an exemplary architectural flow diagram that illustrates program modules for implementing the "topic modeling module" of the "Engagement Predictor" shown in FIG. 1, as described herein.

The resulting set of extracted features 310 is then passed to a transition training module 320 that uses various machine learning techniques to train on the extracted features in combination with web browser log data 150 and optional latent topic distributions 330 derived by the aforementioned topic modeling module 160 (see FIG. 4). Note that training of the transition model 340 is typically performed offline and presented to the user for local use. This allows the near real-time processing of the arbitrary document 100 or other content being consumed by the user, as discussed above. However, it should be understood that training of the transition model 340 could be performed locally by the computing device of the user, if that computing device has sufficient computational resources and access to sufficient amounts of training data.

Referring now to FIG. 4, this figure provides an exemplary architectural flow diagram that illustrates program modules for implementing the "topic modeling module" of the "Engagement Predictor" shown in FIG. 1. As noted above, the topic modeling module 160 uses machine learning techniques to generate the aforementioned topic model 420 from training data comprising source and destination documents 140.

In general, as discussed in further detail in Section 2.5 a JTT learning module 400 applies a generative model, see plate notation for JTT model (410), which posits a distribution over joint latent transition topics for corresponding source and destination documents. In other words, as discussed in further detail throughout Section 2.5, the JTT model 410 uses a generative model of the source and destination documents 140 to automatically learn a specified number of latent semantic topics from those documents whether or not those documents include any topical or categorization information. The result of this modeling process is the aforementioned set of topic distributions 330 that are then used to form the aforementioned topic model 420.

Note that training of the topic model 420 is typically performed offline and presented to the user for local use or used in training the aforementioned transition model 340. This allows the near real-time processing of the arbitrary document 100 or other content being consumed by the user, as discussed above. As with the transition model 340, training of the topic model 420 could be performed locally by the computing device of the user, if that computing device has sufficient computational resources and access to sufficient amounts of training data.

Figure 5:
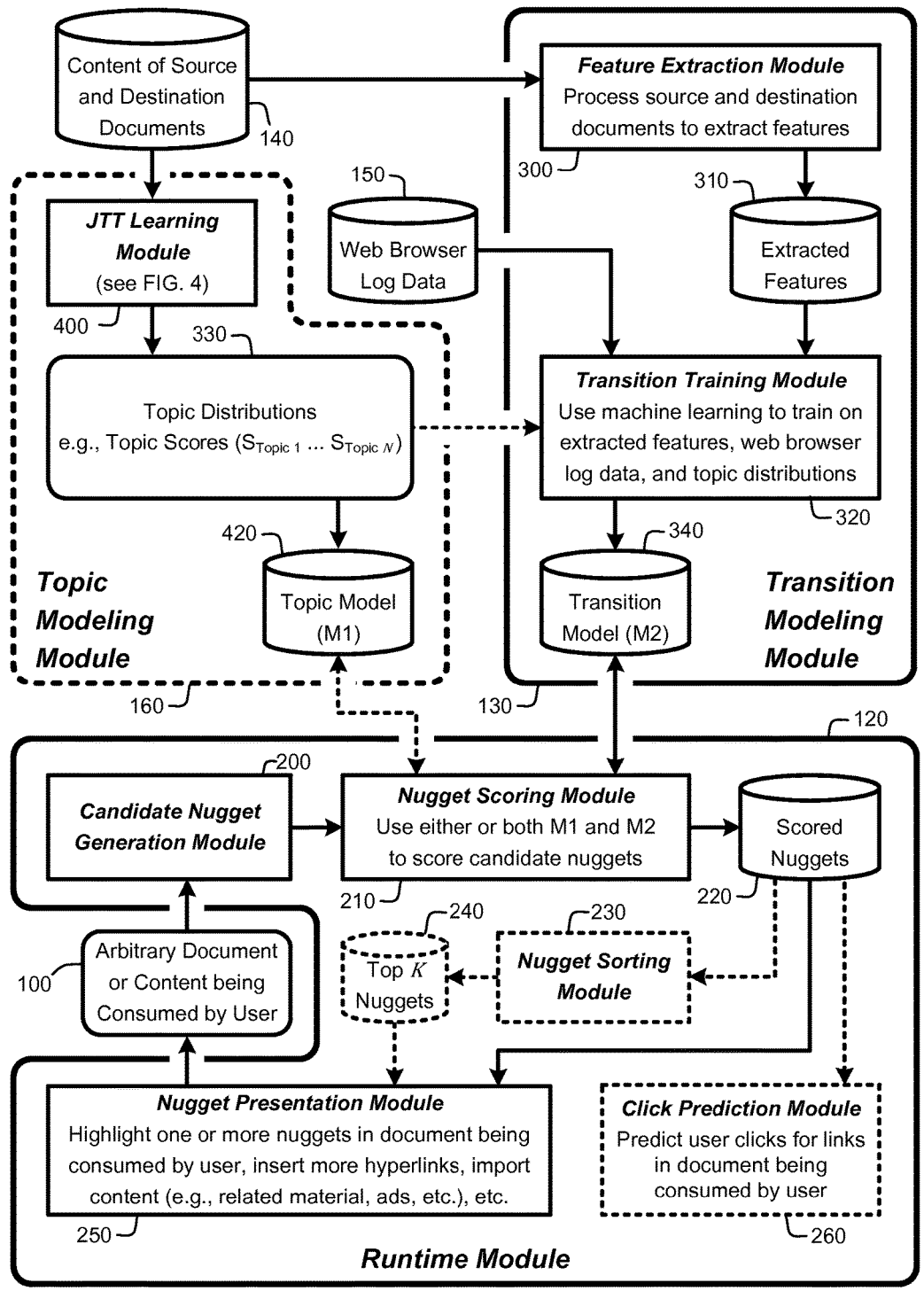
FIG. 5 provides an alternate architectural flow diagram that illustrates program modules for implementing the "Engagement Predictor" shown in FIG. 1, as described herein.

Referring now to FIG. 5, this figure provides an alternate architectural flow diagram that illustrates program modules for implementing the "Engagement Predictor" shown in FIG. 1. In general, FIG. 5 illustrates a combination of the runtime module 120 described with respect to FIG. 1 and FIG. 2, the transition modeling module 130 described with respect to FIG. 1 and FIG. 3, and the topic modeling module 160 described with respect to FIG. 1 and FIG. 4. Consequently, since FIG. 5 is intended to show interoperation of the aforementioned modules, rather than to introduce new modules, the description of those modules will not be repeated with respect to FIG. 5.

2.0 Operational Details of the Engagement Predictor:

The above-described program modules are employed for implementing various embodiments of the Engagement Predictor. As summarized above, the Engagement Predictor provides various techniques for predicting whether things and concepts in content (i.e., the aforementioned "interesting nuggets") will be sufficiently engaging or interesting to a user that the user is likely to investigate or follow links to related things or content. The following sections provide a detailed discussion of the operation of various embodiments of the Engagement Predictor, and of exemplary methods for implementing the program modules described in Section 1 with respect to FIG. 1. In particular, the following sections provides examples and operational details of various embodiments of the Engagement Predictor, including:

An operational overview of the Engagement Predictor;
Identifying candidate nuggets in arbitrary content;
The concept of "interestingness";
Predicting interestingness in arbitrary documents;
The semantics of interestingness; and
Examples of augmentation of arbitrary documents based on predictions of interesting nuggets.

2.1 Operational Overview:

As noted above, the processes described herein provide various techniques for predicting whether interesting nuggets in content will be sufficiently engaging or interesting to a user that the user is likely to investigate or follow links to related things or content.

More specifically, the Engagement Predictor provides a notion of interestingness, i.e., an interestingness score, of a nugget on a page that is grounded in observable behavior during content consumption. The interestingness score for prediction of interestingness of nuggets is determined by evaluating arbitrary documents using a learned transition model. Training of the transition model combines web browser log data and latent semantic features in training data (i.e., source and destination documents) automatically derived by a JTT Model.

The JTT model takes into account latent topic distributions for source documents, destination documents, and transitions from source to destination documents. The latent semantic features derived by the topic model were observed to improve performance of the transition model for determining interestingness scores (i.e., making interestingness predictions) for nuggets in the arbitrary content being consumed by the user. The interestingness scores are then used for highlighting one or more nuggets, inserting one or more hyperlinks relating to one or more nuggets, importing content relating to one or more nuggets, predicting user clicks, etc.

The above summarized capabilities enable a number of advantageous uses, including, but not limited to:
  Providing a measure of "interestingness" that is grounded in observable behavior during content consumption.
  Providing a probabilistic model of interestingness (i.e., the aforementioned "topic model"), which captures latent aspects that drive a user to be interested in browsing or transitioning from one document to another, by jointly combining the latent semantics of the source and destination documents with the intent of the transition.
  Predicting interesting browsing transitions by training on large numbers of real-world browsing events to learn a discriminative model (i.e., the aforementioned "transition model") that combines evidence including, but not limited to, web browser log data, distributions from the topic model, contextual features in source documents, geospatial and time features, user demographics, etc.
  Using the aforementioned topic and transition models to evaluate latent semantic features in arbitrary documents being consumed by the user for predicting the interesting links and content for a user in web browsing scenarios.

2.2 Identifying Candidate Nuggets in Arbitrary Content:

The Engagement Predictor uses any of a wide range of techniques to generate the initial candidate list of interesting nuggets on an arbitrary page or other document. For example, in one approach, the Engagement Predictor uses any of a number of existing Named Entity Recognition (NER) techniques to extract potential or candidate nuggets from arbitrary documents. However, this does not solve the problem entirely, since named entities are not always the only interesting nuggets in a document. In fact, as noted above, nuggets can include general terms and concepts in a document, images, audio content, etc. Consequently, in related embodiments, the Engagement Predictor simply adds any or all images or audio in a document to the list or set of candidate nuggets. Similarly, language-based processing of the arbitrary document can be used to identify higher order general terms and concepts, each of which can also be added to the list or set of candidate nuggets.

Note that the Engagement Predictor can also consider one or more specified subsets (or combinations of subsets) of document content for inclusion in the list or set of candidate nuggets. For example, the Engagement Predictor can be set to consider only hyperlinks as a subset of nuggets, only proper names as a subset of nuggets, only place names as a subset of nuggets, only images as a subset of nuggets, etc., or any combination of such subsets.

Further, typical computational resources are generally sufficient to quickly process large numbers of candidate nuggets from arbitrary documents being consumed by the user. Consequently, once the transition model has been trained, in various embodiments, the Engagement Predictor simply treats every word, phrase, sentence, image, audio, hyperlink, etc., in an arbitrary document as individual candidate nuggets. Computation of interestingness scores using the transition model can then be used to reduce very large numbers of candidate nuggets to a relatively small list of nuggets expected to be of interest to the user.

2.3 The Concept of "Interestingness":

As noted above, "interestingness" is defined herein as a computed score or statistical measure relating to the likelihood that the user will be interested in pursuing, consuming, or transitioning to content related to one or more interesting nuggets that are automatically identified in an arbitrary document being consumed by the user. Measures of interestingness are, in part, manifested in observable click behaviors (e.g., historical click logs), which forms one of the signals utilized by the Engagement Predictor for use in training one or more of the models described herein.

When initially training models such as the aforementioned transition model (and when evaluating arbitrary document being consumed by the user), the Engagement Predictor treats anchors (e.g., hyperlinks), text, images, etc., on a page (or other document) as the set of candidate nuggets. When building models, the Engagement Predictor utilizes observed click behavior (e.g., historical click logs) as a proxy signal for interestingness. This allows the Engagement Predictor to build models of interestingness that approximate click behavior by using features from the current content, the destination content, and the user.

Note that while the Engagement Predictor focuses on browsing behavior as one of the model training signals in various embodiments, this does not limit the application of the models learned by the Engagement Predictor to the web alone. Since the Engagement Predictor uses general document level and semantic features in the learned models, those the models can also be applied to documents in general, even though they are trained, in part, on web browsing data.

In general, the training data utilized by the Engagement Predictor consists of randomly sampled browsing transitions (clicks on anchors) from a source page (or other document) to a destination page (or other document). Model training can be performed on any transition data set, e.g., clicking on links in a source document to land on or retrieve a destination document. An evaluation of such links leads to the observation that the semantics of the content of both the source and destination pages (or other documents) play a role in what users find interesting.

In addition, user and time information play into the concept of interestingness. For example, it is a reasonable hypothesis that users from very different geographic (and hence cultural) backgrounds might show different patterns in what they find interesting. Similarly, it is not unreasonable to assume that browsing behavior during weekends might be different from the behavior on week days. Consequently in various embodiments, factors such as geographic data, demographic data (e.g., gender, age, nationality, educational levels, etc.), time data, etc., are used as features in training the transition model. In addition, it is well known that the position of a link (or other nugget) on a page (or other document) influences user click behavior, i.e., links that are higher on a page (or other document) or in more prominent position tend to attract more clicks. Consequently, in various embodiments, link or nugget position was added as a feature when training the transition model.

2.4 Predicting Interestingness:

For purposes of explanation, the following discussion focuses on the assignment of an interestingness score to a candidate nugget, where a candidate nugget is an anchor or link on a page (or other document). However, as noted above, these interesting nuggets can be any content on a page or document, including, but not limited to words, images, audio, etc. Further, automatic identification of such nuggets is accomplished by parsing the document to identify words (including phrases, sentences, topics, etc.), images, audio, etc. As such, considering the case of anchors on a page (or other document) for purposes of explanation, the set of candidate nuggets for that page (or other document) is simply the set of anchor texts on a source page (or other document).

Given this set of candidate nuggets on an arbitrary page, the Engagement Predictor determines some number, k, anchors (or other interesting nuggets) on a page (or other document) that the user will likely find interesting and then highlights or augments those anchors (or other interesting nuggets), and/or the Engagement Predictor uses either or both the aforementioned transition model and the topic model to predict which nugget the user is likely to click on next.

2.4.1 Training Data Set:

For purposes of testing various embodiments of the Engagement Predictor, in a tested embodiment, a training data set was created using a full dump of English Wikipedia (available at http://dumps.wikimedia.org) containing about 4.1 million unique documents (i.e., web pages in this case). The training data set was used in combination with web browser log data joined against the Wikipedia data to capture instances where a user transitioned from one Wikipedia page to another by clicking on one of the anchors of the document. The result of this training process was a version of the aforementioned transition model trained on real-world data that included pre-defined topics (i.e., topic of each page was available within each page from manual categorization data entered by the Wikipedia editors of each page).

In general, it should be understood that any data sets having anchors and transitions can be used for training purposes, and that the Wikipedia data was used simply for purposes of testing the various capabilities of the Engagement Predictor. Advantageously, the browser log data provides metadata for each transition from a source (s) page (e.g., a Wikipedia page or any other page or document) to a destination (d) document, including each user's local time, user location, and user dwell time (which can be used for purposes including, but not limited to, filtering to eliminate erroneous clicks, such as where the user quickly transitions away from a page that she just landed on following a click). A source/destination pair (s, d) of URLs represents where a user clicked on an anchor in a source document S and continued browsing the content of a destination document D as a transition. For example, if the web browser log data shows that one or more users clicked on a link in a particular Wikipedia page to transition to a particular other Wikipedia page, then that transition corresponds to a pair (s, d).

While not necessary to the operation or design of the Engagement Predictor, or any models used or constructed by the Engagement Predictor, for purposes of testing, performance of the transition model resulting from processing of the Wikipedia and browsing data was used as a benchmark to compare performance of other transition models learned using latent semantic topics automatically generated from the aforementioned JTT model.

In the case where the JTT model is used to learn latent semantic topics from source and destination documents in an unsupervised manner, the JTT model does not directly consider any categorization information, if it exists at all, in any of the source and destination documents used as a training data set. As such, pre-labeled pages having topical or categorization information, such as Wikipedia pages, are not needed for use by the JTT model to train topic models from collections of source and destination documents. In other words, as discussed in further detail throughout Section 2.5, the JTT model automatically learns a specified number of latent semantic topics whether or not the source and destination pages include any topical or categorization information. The resulting learned latent semantic topics can then be used, in combination with browser logs, to learn the aforementioned transition model, which in turn is then used to compute interestingness scores for nuggets in arbitrary documents being consumed by the user.

Note also that statistical or probabilistic distributions for the latent semantic topics learned by the JTT model can also be used as a model (i.e., the aforementioned topic model (M1), as shown in FIG. 4) to determine interestingness scores for nuggets in arbitrary documents being consumed by the user. In other words, the latent semantic topics learned by the JTT model are either used in combination with browsing data to train the aforementioned transition model, or the latent semantic topics learned by the JTT model are used as a standalone topic model. In either case, the transition model and/or the topic model (e.g., see FIG. 1, as discussed above) are then used to determine interestingness scores for nuggets in arbitrary documents being consumed by the user.

Further, it is important to understand that the latent topics extracted by the JTT model are one of the types of "features" that are used for training the aforementioned transition model. As such the JTT model can also be considered to represent a technique that automatically learns to do feature extraction from arbitrary sets of source and destination documents by simply being told the number of topics (or features) to extract. The idea of doing feature extraction in a way that is automatic is also a prominent property of "Deep Learning" techniques. However, conventional deep learning is not achieved through topic modeling (such as the aforementioned JTT model), but is instead typically accomplished using neural networks and the like.

As such, in addition to the using JTT-based techniques described herein, other techniques for learning or extracting topics or features from documents can also be used by the Engagement Predictor to provide data for training the aforementioned transition model. For example, feature extraction can be done by hand coding features (e.g., Wikipedia type manual page categorization), or by using recurrent neural networks, convolutional neural networks, fully connected deep neural networks, Boltzmann machines, or other machine learning techniques for learning or extracting features from documents.

2.4.2 The Prediction Task:

Let U be the set of all training documents and A the set of all nuggets in U, respectively. Let $A_u \subset A$ be the set of nuggets in $u \in U$. Given these relations, the interestingness prediction task is defined by Equation (1) as learning the function:

$$\sigma : U \times A \to \mathbb{R} \qquad \text{Eqn. (1)}$$

where $\sigma(u, a)$ reflects the interestingness score of a particular nugget a in u, and where $\sigma(u, a)=0$ for all $a \notin A_u$.

In a tested embodiment, the Engagement Predictor used a boosted decision tree algorithm to learn a regression model (i.e., the aforementioned transition model). However, it should be understood that any desired computer learning technique can be used, including, but not limited to gradient boosted decision trees, logistic regression, support vector machines, perceptron learning, artificial neural networks, inductive logic programming, Bayesian networks, reinforcement learning, etc.

In the case of the aforementioned boosted decision tree algorithm, hyperparameters such as number of iterations, learning rate, minimum instances in leaf nodes, and the maximum number of leaves were tuned using 3-fold cross-validation on the training data. However, it should be understood that other validation cases may be used and other hyperparameters may also be used without departing from the intended scope of the Engagement Predictor described throughout this document.

The observed interestingness scores (i.e., interestingness scores) which the transition model regresses to are derived from user clicks on anchors in a source page (or other document) s leading to a destination page (or other document) d. Specifically, the regression target is p(d|s), where this probability is estimated using the aggregated click counts on d in s and the total number of clicks on any anchor in s.

Each nugget/document pair is represented as a vector of features, where the features fall into basic categories (some of which can be determined automatically via the JTT model, some of which may be manually specified, and some of which can be determined using other techniques as discussed throughout this document. In any case, these features include, but are not limited to:
1. Geotemporal features, including, but not limited to, country, city, postal code, region, state, time zone, time of click, day of click, season (e.g., summer, winter, etc.), etc.
2. Nugget features, including, but not limited to, position of the nugget in the document, frequency of the nugget in the document, density of the nugget in the paragraph where it located, whether the nugget text matches the title of the destination page (or other document), etc.
3. Explicit semantic features inherent in the documents. Note that in the case of Wikipedia data, the Engagement Predictor automatically extracts the topic of each page from available data within each page that is created via manual categorization by the Wikipedia editors of each page. Other pages or documents may also provide this information without evaluation of the content. However, such data can be obtained whenever necessary by using a variety of conventional automated content evaluation techniques (e.g., name recognition, place name recognition, historical date recognition, etc.) to determine the semantic content. Further, documents can be also be manually updated to tag those documents with topic or semantic data that may then be used by the Engagement Predictor.
4. Latent semantic features derived from an unsupervised joint topic model (i.e., the aforementioned latent semantic topics learned by the JTT model) of source and destination documents (as described in detail below in Section 2.5).

2.5 the Semantics of Interestingness:

As noted above, the Engagement Predictor uses various techniques to learn models of interestingness (e.g., the aforementioned transition model and topic model) that are capable of scoring interesting nuggets in an arbitrary document according to the probability that these interesting nuggets are of interest to a user when he is consuming the document content.

Also as noted above, the semantics of the source and destination page or document play a role in whether an anchor (or other interesting nugget) is perceived as interesting. This reflects the intuition that notions of human interests are usually encoded in higher level concepts or semantic spaces which are influenced by document contents. For example, when people are consuming a movie page, they are likely to be interested in the lead actor or actresses, or the director associated with the movie. However, many movie related pages include other related information like shooting venue, release budget, sales, critics, etc., which are rarely clicked, thus showing a lower interest by users. As such, there is an interest mapping of movie to artist (or director), where movie and artist are some higher level semantic abstractions of all movie and actor pages.

As noted above, in various embodiments, the Engagement Predictor either extracts latent semantic or topic data from documents (i.e., using the aforementioned JTT model), or uses various techniques to automatically determine explicit semantic information or topics in the document by using a variety of conventional automated content evaluation techniques (e.g., name recognition, place name recognition, historical date recognition, etc.) to determine the semantic content. This information is then used in combination with web browser log data to train the aforementioned transition model for use in evaluating arbitrary documents being consumed by the user.

For example, in some cases, such as Wikipedia pages, human editors manually assign topical categories to documents. In various embodiments, the Engagement Predictor leverages this information to automatically obtain the semantic information of such documents without requiring detailed analysis or processing of the documents using the JTT model. This allows the Engagement Predictor to measure the influence of the content semantics of source and destination page or document on interestingness. Unfortunately, such information is not always available in a page or document.

Consequently, since such information has been observed to influence interestingness scores, in various embodiments, the Engagement Predictor provides an unsupervised semantic model of source and destination pages (i.e., the aforementioned JTT model that operates to model semantic information (i.e., latent semantic topics) in documents without considering or caring wither manual annotations, such as that provided by Wikipedia pages, exist in the document. The resulting topic model can then serve the purpose of providing semantic signals for interestingness in a general manner without the limits of Wikipedia or other manually categorized pages or documents.

More specifically, in various embodiments the JTT model of the Engagement Predictor provides a generative model of the semantics of browsing. Referring to the notations in Table 1, this generative model (see JTT model diagram 410 in FIG. 4) starts by positing a distribution over joint latent transition topics (as a higher level semantic space), $\theta_t$ for each transition t. The corresponding source, t(s) and destination, t(d) documents of a given transition t are assumed to be admixtures of latent topics which are conditioned on the joint topic transition distribution, $\theta_t$. The detailed generative process, referred to herein as the Joint Transition Topic (JTT) Model is described below in Section 2.5.1.

2.5.1 Generative Process of the JTT Model:

Variable names and their descriptions, as used in the following discussion of the JTT model, are provided below in Table 1. Note also that element 410 of FIG. 4 shows a plate notation of the JTT model that also makes use of the notation defined in Table 1.

TABLE 1

List of Notations

| Variable | Description |
|---|---|
| t | A transition t from a source document s to a destination document d |
| t(s), t(d) | The source and destination documents of t |
| $\theta_t \sim \text{Dir}(\alpha)$ | Joint source/destination topic distribution |
| $z_s, z_d$ | Latent topics of t(s), t(d) respectively |
| $w_s, w_d$ | Observed word tokens of t(s), t(d) respectively |
| $\varphi_k \sim \text{Dir}(\beta)$ | Latent topic-word distributions for topic k |
| $\alpha, \beta$ | Dirichlet parameters for $\theta, \varphi$ |
| $N_s, N_d$ | Number of terms in source and destination documents of t |
| $T = \{t\}$ | Set of all transitions, t |
| K | Number of topics |
| V | Number of unique terms in the vocabulary |
| $Z^S, Z^D$ | Set of all topics in the source and destination documents |
| $W^S, W^D$ | Set of all word tokens in the source and destination documents |
| $\Theta = \{\theta_t\}$ | Set of all latent joint transition topic distributions |
| $\Phi = \{\varphi_k\}$ | Set of all latent topics |
| $\theta_{t,k}$ | Contribution of topic k in transition t |
| $w_{t,j}^S, w_{t,j}^D$ | jth word of transition t in t(s), t(d) |
| $z_{t,j}^S, z_{t,j}^D$ | Latent topic of jth word of transition t in t(s), t(d) |
| $n_{t(s),k}^S$ | Number of words in t(s) assigned to topic k |
| $n_{t(d),k}^D$ | Number of words in t(d) assigned to topic k |
| $n_{k,v}^S$ | Number of times word v assigned to topic k in $W^S$ |
| $n_{k,v}^D$ | Number of times word v assigned to topic k in $W^D$ |

In general, as illustrated by the plate notation of the JTT model (i.e., JTT model 410 of FIG. 4) operates, using the notation as defined in Table 1. However, it should be understood that for purposes of explanation, both Table 1 and the JTT model 410 shown in FIG. 4 are directed towards text (i.e., words) in documents for extraction of text-based features. However, it should be understood that feature extraction performed by the JTT model can be expanded to include other feature types, e.g., images. In view of this understanding, text-based feature extraction by the JTT model generally operates as follows, with additional detail provided in the following paragraphs:

1. For each topic k, draw $\varphi_k \sim \text{Dir}(\beta)$
2. For each transition t:
   i. Draw the joint topic transition distribution, $\theta_t \sim \text{Dir}(\alpha)$
   ii. For each word token $j \in \{1 \ldots N_S\}$:
      a) Draw $z_{t,j}^S \sim \text{Mult}(\theta_t)$
      b) Emit $w_{t,j}^S \sim \text{Mult}(\varphi_k)$
   iii. For each word token $j \in \{1 \ldots N_D\}$:
      a) Draw $z_{t,j}^D \sim \text{Mult}(\theta_t)$
      b) Emit $w_{t,j}^D \sim \text{Mult}(\varphi_k)$ 2.5.2 Inference:

This following discussion details JTT model inference, beginning with a derivation of the joint distribution of the JTT model, followed by Markov Chain Monte Carlo (MCMC) Gibbs sampling for learning the model from data. Note that other sampling techniques can be used for this purpose, and that the Engagement Predictor is not limited to the use of MCMC Gibbs sampling type techniques. To derive the joint distribution, the model is factored according to the causalities governed by the Bayesian network of the JTT model, as illustrated below by Equation (2):

$$P(W^S, W^D, Z^S, Z^D) = P(W^S, W^D | Z^S Z^D) P(Z^S Z^D) \quad \text{Eqn. (2)}$$

Approximate posterior inference is employed using Monte Carlo Gibbs sampling and Rao-Blackwellization to reduce sampling variance by collapsing on the latent variables $\theta$ and $\varphi$. The second factor of Equation (2), i.e., $P(Z^S, Z^D)$, is first computed as illustrated by Equation (3), as follows:

$$P(Z^S, Z^D) = \quad \text{Eqn. (3)}$$

$$\int P(Z^S, Z^D | \Theta) d\Theta = \int \prod_{t=1}^{T} \left\{ \left( \prod_{j=1}^{N_s} p(z_{t,j}^S | \theta_t) \right) \left( \prod_{j=1}^{N_d} p(z_{t,j}^D | \theta_t) \right) \right.$$

$$\left. \left( \frac{1}{B(\alpha)} \prod_{k=1}^{K} (\theta_{t,k})^{\alpha-1} \right) \right\} d\Theta =$$

$$\int \prod_{t=1}^{T} \left\{ \begin{array}{c} \left( \prod_{j=1}^{N_s} \prod_{k=1}^{K} (\theta_{t,k})^{x_k^{t,j}} \right) \times \\ \left( \prod_{j=1}^{N_d} \prod_{k=1}^{K} (\theta_{t,k})^{x_k^{t,j}} \right) \left( \frac{1}{B(\alpha)} \prod_{k=1}^{K} (\theta_{t,k})^{\alpha-1} \right) \end{array} \right\} d\Theta$$

Where $x_k^{t,j} = [x_1^{t,j}, x_2^{t,j}, \ldots x_K^{t,j}]$ is 1-of-K encoded and exactly one of its components attains a value of 1 while rest have a value of 0. Upon careful observation and groupings, these can be replaced with appropriate count variables as illustrated by Equation (4), as follows:

$$\int \prod_{t=1}^{T} \left( \frac{1}{B(\alpha)} \prod_{k=1}^{K} (\theta_{t,k})^{n_{t(s),k}^S + n_{t(d),k}^D + \alpha - 1} \right) d\Theta$$

As each $\theta_t$ is conditionally independent given the hyperparameter $\alpha$, this gives the relation illustrated by Equation (5), as follows:

$$\prod_{t=1}^{T} \frac{1}{B(\alpha)} \int \left( \prod_{k=1}^{K} (\theta_{t,k})^{n_{t(s),k}^S + n_{t(d),k}^D + \alpha - 1} \right) d\theta_t = \prod_{t=1}^{T} \frac{B(n_{t(s),[]}^S + n_{t(d),[]}^D + \alpha)}{B(\alpha)}$$

The above simplification can be obtained using various techniques for solving Dirichlet integrals and consequently reduced. Note that omission of a latter index in the count variables denoted by [ ] corresponds to the row vector spanning over the latter index. The function B(•) refers to the multinomial beta function given by Equation (6), as illustrated below:

$$B(\alpha) = B(\alpha_1, \ldots \alpha_{dim(\alpha)}) = \frac{\prod_{i=1}^{dim(\alpha)} \Gamma(\alpha_i)}{\Gamma\left( \sum_{i=1}^{dim(\alpha)} \alpha_i \right)}$$

Using similar techniques as above, it can be seen that the first factor of Equation (2), i.e., $P(W^S, W^D | Z^S, Z^D)$, simplifies as illustrated by Equation (7), as follows:

$$P(W^S, W^D | Z^S, Z^D) = \prod_{t=1}^{K} \frac{B(n_{k,[]}^S + n_{k,[]}^D + \beta)}{B(\beta)}$$

Thus, the full joint can be written succinctly as illustrated by Equation (8), as follows:

$$P(W^S, W^D, Z^S, Z^D) = \left(\prod_{t=1}^{T} \frac{B(n^S_{t(s),[]} + n^D_{t(d),[]} + \alpha)}{B(\alpha)}\right)\left(\prod_{t=1}^{K} \frac{B(n^S_{k,[]} + n^D_{k,[]} + \beta)}{B(\beta)}\right)$$

Having obtained the joint, it is straightforward to derive the Gibbs sampler for learning the model. Starting with the Gibbs conditional distribution for $z^S$ results in Equation (9), as follows:

$$p(z^S_{t,j} = k \mid W^S_{\neg(t,j)}, Z^S_{\neg(t,j)}, W^D, Z^D, w^S_{t,j}) \propto$$

$$\frac{P(W^S, W^D, Z^S, Z^D)}{p(w^S_{t,j})P(W^S_{\neg(t,j)}, W^D \mid Z^S_{\neg(t,j)}, Z^D)P(Z^S_{\neg(t,j)}, Z^D)} \propto$$

$$\frac{\left[\left(\prod_{t=1}^{T} \frac{B(n^S_{t(s),[]} + n^D_{t(d),[]} + \alpha)}{B(\alpha)}\right)\left(\prod_{t=1}^{K} \frac{B(n^S_{k,[]} + n^D_{k,[]} + \beta)}{B(\beta)}\right)\right]}{\left[\left(\prod_{t=1}^{T} \frac{B(n^S_{t(s),[]} + n^D_{t(d),[]} + \alpha)}{B(\alpha)}\right)\left(\prod_{t=1}^{K} \frac{B(n^S_{k,[]} + n^D_{k,[]} + \beta)}{B(\beta)}\right)\right]_{\neg(t,j)}} \propto$$

$$\left(\prod_{t=1}^{T} \frac{B(n^S_{t(s),[]} + n^D_{t(d),[]} + \alpha)}{B(n^S_{t(s),[]} + n^D_{t(d),[]} + \alpha)_{\neg(t,j)}}\right)\left(\prod_{t=1}^{K} \frac{B(n^S_{k,[]} + n^D_{k,[]} + \beta)}{B(n^S_{t(s),[]} + n^D_{t(d),[]} + \beta)_{\neg(t,j)}}\right)$$

where the subscript ($\neg (t,j)$) denotes the value of the expression excluding the counts of the term (t,j).

Further, noting that $$(n^S_{t(s),k})_{\neg(t,j)} = \begin{cases} n^S_{t(s),k}, & k \neq k' \\ n^S_{t(s),k} - 1, & k = k' \end{cases} \quad \text{Eqn. (10)}$$

where k' is a candidate topic assigned to (t,j), the expression of Equation (9) can be further simplified as illustrated by Equation (11), as follows:

$$p(z^S_{t,j} = k \mid \ldots) \propto \frac{(n^S_{t(s),k})_{\neg(t,j)} + n^D_{t(d),k} + \alpha}{\sum_{k=1}^{K}\left((n^S_{t(s),k})_{\neg(t,j)} + n^D_{t(d),k} + \alpha\right)} \frac{(n^S_{k,v})_{\neg(t,j)} + n^D_{k,v} + \beta}{\sum_{v=1}^{V}\left((n^S_{k,v})_{\neg(t,j)} + n^D_{k,v} + \beta\right)}$$

Using derivation techniques similar to above, the Gibbs conditional for $z^D$ can then be derived as illustrated by Equation (12), as follows:

$$p(z^S_{t,j} = k \mid \ldots) \propto \frac{n^S_{t(s),k} + (n^D_{t(d),k})_{\neg(t,j)} + \alpha}{\sum_{k=1}^{K}\left(n^S_{t(s),k} + (n^D_{t(d),k})_{\neg(t,j)} + \alpha\right)} \frac{(n^S_{k,v})_{\neg(t,j)} + n^D_{k,v} + \beta}{\sum_{v=1}^{V}\left(n^S_{k,v} + (n^D_{k,v})_{\neg(t,j)} + \beta\right)}$$

2.5.3 Posterior:

Having sampled latent variable $\{z^S, z^D\}$ and observed $\{W^S, W^D\}$, the following discussion details the posterior predictive distribution for the JTT model. In particular, using the fact that Dirichlet is conjugate to the Multinomial, the point estimates of the posterior distributions can be computed as illustrated by Equation (13), as follows:

$$\hat{\theta}_{t,k} = E[\theta_{t,k} \mid Z^S, Z^D] = \frac{n^S_{t(s),k} + (n^D_{t(d),k}) + \alpha}{\sum_{k=1}^{K}(n^S_{t(s),k} + (n^D_{t(d),k}) + \alpha)}$$

$$\hat{\varphi}_{k,v} = E[\varphi_{k,v} \mid W^S, W^D] = \frac{n^S_{k,v} + n^D_{k,v} + \beta}{\sum_{v=1}^{V}(n^S_{k,v} + n^D_{k,v} + \beta)}$$

2.5.4 Training Settings:

In a tested embodiment, the topic model was generated from a random traffic-weighted sample of 10,000 transitions between source and destination documents. However, it should be understood that any desired number of transitions can be used for this purpose.

Dirichlet hyperparameters during training were set to $\alpha=50/K$ and $\beta=0.1$, however, any other desired values can be used for this purpose. The number of topics, K, was empirically set to 50, although either more or fewer topics can be specified, if desired. One point of interest is that it is the number of topics that are specified here, and that the JTT model then automatically obtains or learns the specified number of different latent semantic topics without the need to ever specify or present the particular topics learned by the model.

Note that the JTT model is capable of learning these latent semantic topics regardless of whether any of the source or destination documents include explicit indications of content topics or categorization (such as can be found in Wikipedia pages). Note also that while increasing the number of topics and modeling more volume (i.e., more transitions) usually results in lowering of perplexities and better fitting in topic models, it can also result in redundancy in topics which may not be very useful for downstream applications. For example, in some of the general application settings of the Engagement Predictor, where the eventual downstream task is modeling interestingness, it was observed that the value of information contained in the latent semantics of the JTT model reached saturation in response to large increases in the number of topics and the training data size.

In various embodiments, the interestingness prediction model (i.e., the aforementioned transition model) was trained, in part, using three classes of features from the joint topic model to capture the topic distribution of source, destination, and transition: source topic features (i.e., $Z^S$), destination topic features (i.e., $Z^D$), and transition topic features (i.e., $\theta$). The value of each topic feature is the probability of the topic.

2.6 Augmenting Arbitrary Documents Using Learned Models:

As noted above, the Engagement Predictor can be used for a wide range of applications, including, but not limited to, enriching or augmenting content being consumed by the user. Simple examples include automatically identifying interesting nuggets in an arbitrary document (i.e., a "source document"), and then highlighting those nuggets, augmenting those nuggets with new or additional links to one or more destination documents, or using those nuggets as the basis to import, retrieve, or provide links to additional interesting content and/or advertisements. Simple examples of some of these scenarios are provided in the following paragraphs.

2.6.1 Highlighting of Interesting Nuggets:

As noted above, the general idea behind the highlighting task is to propose or present k nuggets (where the value of k can be set to any desired number) that the user is likely to find interesting. In particular, in this task, the Engagement Predictor receives some arbitrary document s∈D that the user is reading or otherwise consuming. The Engagement Predictor then processes that document to extract the set of possible interesting nuggets in that document and then uses the transition and/or topic models to determine which of those nuggets (i.e., the set of k interesting anchors or other nuggets, i.e., A) are likely to be of interest to the user. Similar to Equation (1), the interest function for making this determination is defined by Equation (14), as follows:

$$\varphi: D \times A \to \mathbb{R} \qquad \text{Eqn. (14)}$$

where $\varphi(s, a)$ reflects the user's degree of interest (e.g., an interestingness score) in a particular anchor or nugget, a, while consuming s∈D.

As such, the general idea here is to select k anchors (or other interesting nuggets) that maximize the cumulative degree of interest of the user relative to an interestingness score computed for each nugget. In various embodiments, the Engagement Predictor sorts or ranks the set of k most interesting anchors (or other interesting nuggets) in decreasing order of $\varphi(s, a)$.

In other words, the Engagement Predictor instantiates the transition model on this task by scoring each source-nugget pair and by ordering the nuggets in decreasing order of their prediction score. The Engagement Predictor then selects the top-k anchors or other nuggets (which can be a mix of anchors or other nuggets) for each source document.

As discussed above, each item in the training test set consists of a real-world browsing transition denoted τ(s, a, t), where a represents the anchor clicked from document s that led to document t. Therefore, in order to approximate $\varphi(s, a)$ for arbitrary documents, the Engagement Predictor computes the aggregate average clicks on a from the source page (or other document) s, as illustrated by Equation (15), as follows:

$$\varphi(s, a) = \frac{|\tau(s, a, t)|}{|\tau(s, *, *)|}$$

where |τ(s, a, t)| is the number of transitions from s to t via a in the test set and |τ(s,*,*)| is the number of transitions in the test set originating from document s.

Evaluation of the training data discussed in Section 2.4.1 produced several interesting observations. First, since there are many nuggets on an average page or document, picking a random set of nuggets yields very low average interestingness scores. Further, is not sufficient to simply pick the top positioned n nuggets on a page (i.e., the nuggets closest to the top of the page). In fact, simply picking the top n nuggets was observed to actually underperform a random selection of nuggets from the page or other source document. In other words, interesting nuggets in a page or other document tend not to be just the first or highest positioned nuggets. As such, using a set of anchor features (or features relating to other nuggets), as discussed above, that are extracted from the source and destination documents and used for training the transition model observably improves performance of the transition model.

2.6.2 Click Prediction for Interesting Nuggets:

Other than highlighting interesting nuggets, or using interestingness scores for importing content into documents being consumed by the user, the Engagement Predictor is also capable of performing other tasks, such as, for example, predicting interestingness in the context of any document, whether it be a web page, an email, a book, an image, audio content, etc. Consequently, a natural extension to these capabilities is the additional capability to predict the next click of a user, i.e., click prediction.

There is a subtle but distinct difference between highlighting or augmenting content being consumed by the user and predicting the user's next click. In particular, highlighting or augmenting content attempts to identify a set of interesting nuggets for a source document. A user may ultimately click on only a subset of the nuggets, and perhaps not in the order of most interest (i.e., possibly not in the order of highest to lowest interestingness scores). In contrast, click prediction is an inherently more difficult task, where the focus is on specifically predicting the next click of a specific user.

Unlike in the highlight and augmentation task, there is no partial credit for retrieving other interesting nuggets. Only the prediction of the actual anchor that is specifically clicked by the user is considered a correct result. As such, the Engagement Predictor approaches click prediction somewhat differently.

In particular, in various embodiments, given a particular transition event τ(s, a, d) by a particular user at a particular time, the transition event is presented to the transition model, minus the actual anchor, a, (i.e., τ(s, d) is presented) in combination with the destination d. The transition model in turn predicts an ordered list of most likely nuggets on which the user will click. The cumulative precision at k of a model, is then 1 if any of the predicted nuggets matched a, and 0 otherwise.

In other words, given the source and destination documents, the transition model predicts interesting anchors that could be associated with the source document, and then checks the source document to determine whether any of those predicted anchors match actual anchors in the source document. Matching anchors having the highest interestingness scores are the anchors most likely to be clicked on by the user.

Figure 6:
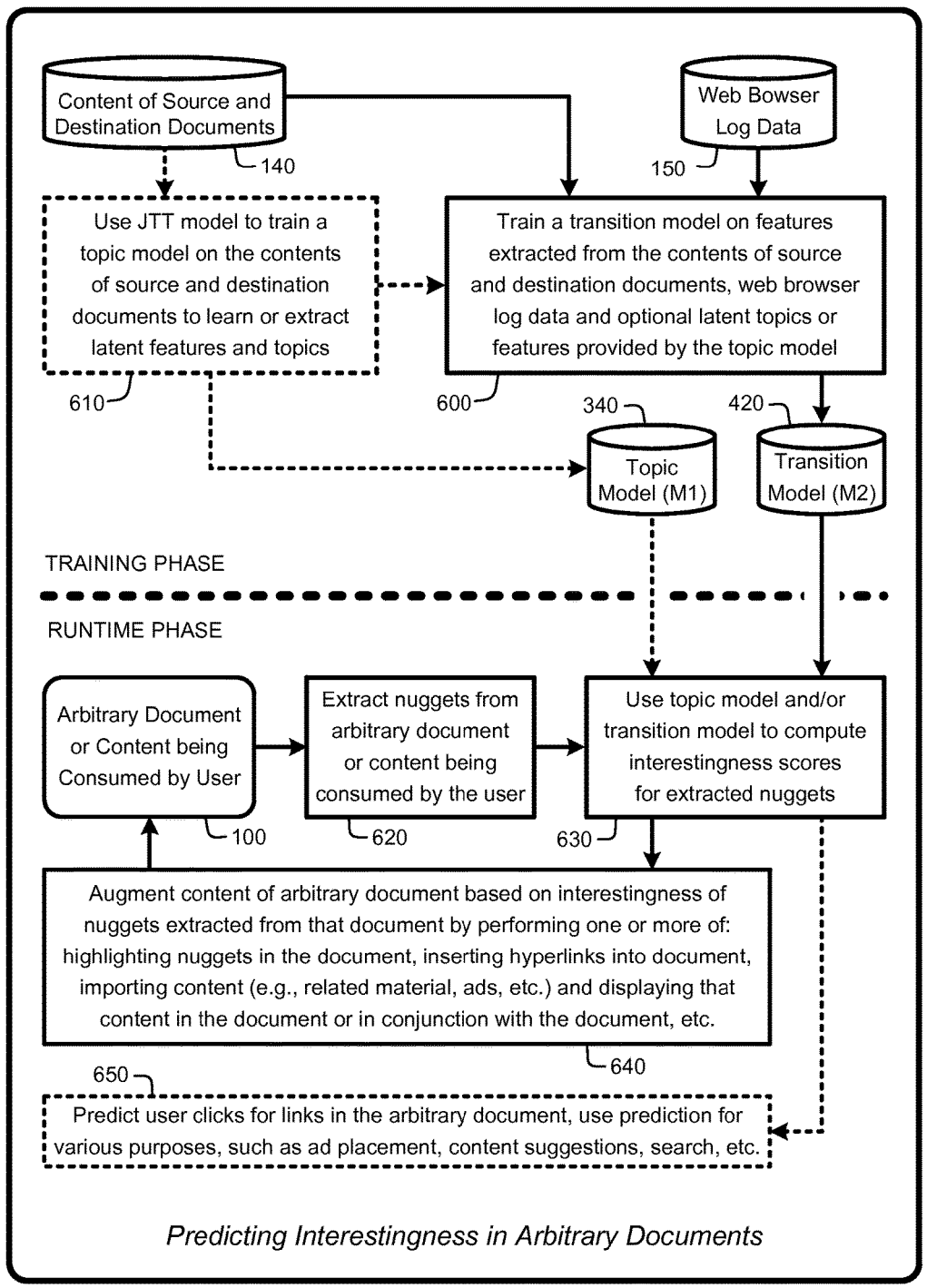
FIG. 6 illustrates a general system flow diagram that illustrates exemplary methods for implementing various embodiments of the Engagement Predictor, as described herein.

3.0 Operational Summary of the Engagement Predictor:

The processes described above with respect to FIG. 1 through FIG. 5, and in further view of the detailed description provided above in Sections 1 and 2, are illustrated by the general operational flow diagram of FIG. 6. In particular, FIG. 6 provides an exemplary operational flow diagram that summarizes the operation of some of the various embodiments of the Engagement Predictor described above. Note that FIG. 6 is not intended to be an exhaustive representation of all of the various embodiments of the Engagement Predictor described herein, and that the embodiments represented in FIG. 6 are provided only for purposes of explanation.

Further, it should be noted that any boxes and interconnections between boxes that are represented by broken or dashed lines in FIG. 6 represent optional or alternate embodiments of the Engagement Predictor described herein, and that any or all of these optional or alternate embodiments, as described below, may be used in combination with other alternate embodiments that are described throughout this document.

In general, as illustrated by FIG. 6, the Engagement Predictor includes a training phase, wherein the aforementioned topic model 340 and the aforementioned transition model 420 are trained. Once these models have been trained, they are made available to a runtime phase of operation. During the runtime phase, nuggets extracted from arbitrary documents 100 are processed using the topic model 340 and/or the transition model 420 to determine interestingness scores to measure the interestingness of each nugget. Content relating to one or more of the nuggets in the arbitrary document 100 is then augmented in view of the corresponding interestingness scores.

More specifically, in the training phase, the Engagement Predictor trains (600) a transition model on features extracted from the contents of source and destination documents 140, web browser log data 150 and optional latent topics or features provided by the topic model. In addition, the Engagement Predictor uses the aforementioned JTT model to train (610) a topic model on the contents of source and destination documents to 140 learn or extract latent features and topics, which as noted above, may be used as part of the training data for learning the transition model. As discussed above, model training is typically performed offline, with the resulting models then being provided for use by one or more users during the runtime phase of operation.

During the runtime phase, the Engagement Predictor automatically extracts (620) nuggets from the arbitrary document 100 or content being consumed by the user. These extracted nuggets are then evaluated using the topic model and/or the transition model to compute (630) interestingness scores for nuggets extracted from the document.

The Engagement Predictor then acts to augment (640) content of the arbitrary document 100 based on the interestingness scores of nuggets extracted from that document by performing one or more of:

Highlighting nuggets in the document;
Inserting hyperlinks into document;
Importing content (e.g., related material, ads, etc.) and displaying that content in the document or in conjunction with the document;
Etc.

Finally, in various embodiments, the Engagement Predictor optionally predicts (650) user clicks for links in the arbitrary document 100. This click prediction can then be used for a wide range of purposes, including, but not limited to ad placement, content suggestions, search, etc.

Figure 7:
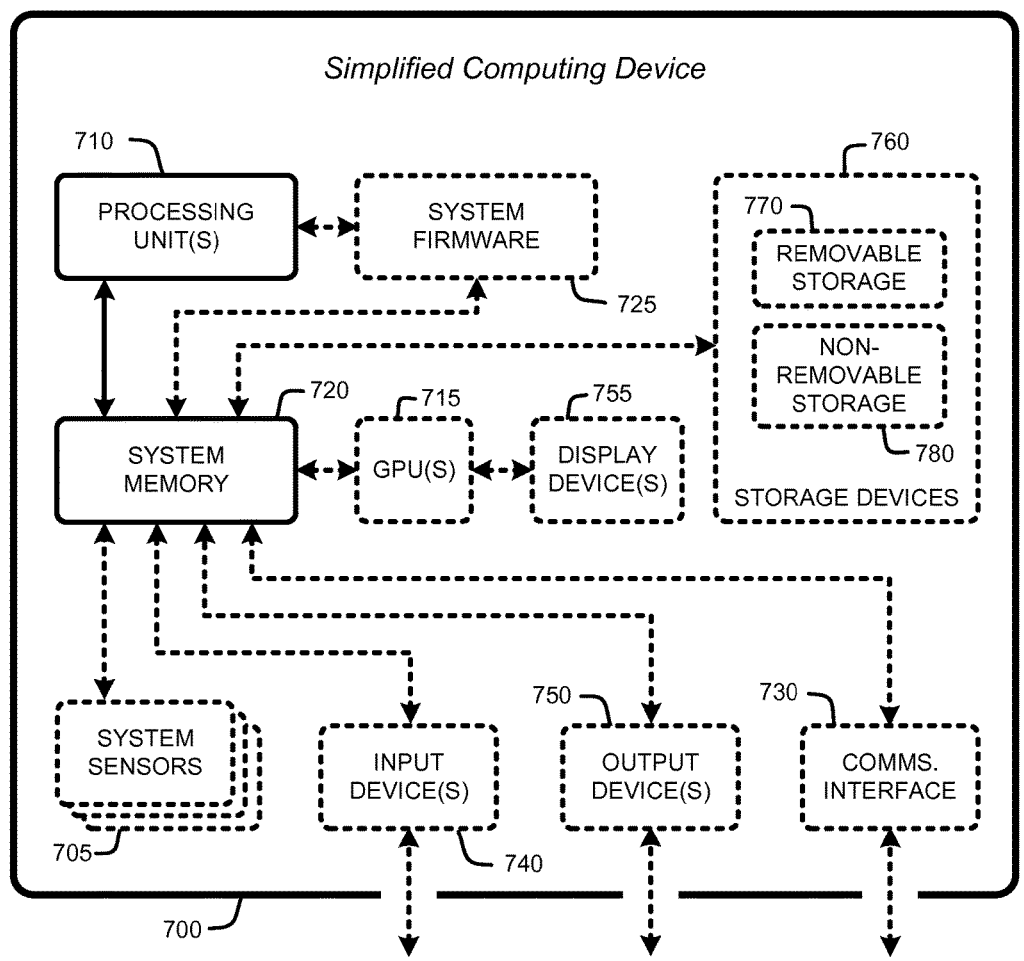
FIG. 7 is a general system diagram depicting a simplified general-purpose computing device having simplified computing and I/O capabilities for implementing various embodiments of the Engagement Predictor, as described herein.

4.0 Exemplary Operating Environments:

The Engagement Predictor described herein is operational within numerous types of general purpose or special purpose computing system environments or configurations. FIG. 7 illustrates a simplified example of a general-purpose computer system on which various embodiments and elements of the Engagement Predictor, as described herein, may be implemented. It should be noted that any boxes that are represented by broken or dashed lines in FIG. 7 represent alternate embodiments of the simplified computing device, and that any or all of these alternate embodiments, as described below, may be used in combination with other alternate embodiments that are described throughout this document.

For example, FIG. 7 shows a general system diagram showing a simplified computing device 700. Examples of such devices operable with the Engagement Predictor, include, but are not limited to, portable electronic devices, wearable computing devices, hand-held computing devices, laptop or mobile computers, communications devices such as cell phones, smartphones and PDA's, multiprocessor systems, microprocessor-based systems, set top boxes, programmable consumer electronics, network PCs, minicomputers, audio or video media players, handheld remote control devices, etc. Note also that the Engagement Predictor may be implemented with any touchscreen or touch-sensitive surface that is in communication with, or otherwise coupled to, a wide range of electronic devices or objects.

To allow a device to implement the Engagement Predictor, the computing device 700 should have a sufficient computational capability and system memory to enable basic computational operations. In addition, the computing device 700 may include one or more sensors 705, including, but not limited to, accelerometers, cameras, capacitive sensors, proximity sensors, microphones, multi-spectral sensors, etc. Further, the computing device 700 may also include optional system firmware 725 (or other firmware or processor accessible memory or storage) for use in implementing various embodiments of the Engagement Predictor.

As illustrated by FIG. 7, the computational capability of computing device 700 is generally illustrated by one or more processing unit(s) 710, and may also include one or more GPUs 715, either or both in communication with system memory 720. Note that that the processing unit(s) 710 of the computing device 700 may be a specialized microprocessor, such as a DSP, a VLIW, or other micro-controller, or can be a conventional CPU having one or more processing cores, including specialized GPU-based cores in a multi-core CPU.

In addition, the simplified computing device 700 may also include other components, such as, for example, a communications interface 730. The simplified computing device 700 may also include one or more conventional computer input devices 740 or combinations of such devices (e.g., touchscreens, touch-sensitive surfaces, pointing devices, keyboards, audio input devices, voice or speech-based input and control devices, video input devices, haptic input devices, devices for receiving wired or wireless data transmissions, etc.). The simplified computing device 700 may also include other optional components, such as, for example, one or more conventional computer output devices 750 (e.g., display device(s) 755, audio output devices, video output devices, devices for transmitting wired or wireless data transmissions, etc.). Note that typical communications interfaces 730, input devices 740, output devices 750, and storage devices 760 for general-purpose computers are well known to those skilled in the art, and will not be described in detail herein.

The simplified computing device 700 may also include a variety of computer readable media. Computer readable media can be any available media that can be accessed via storage devices 760 and includes both volatile and nonvolatile media that is either removable 770 and/or non-removable 780, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Engagement Predictor described herein, or portions thereof, may be stored, received, transmitted, or read from any desired combination of computer or machine readable media or storage devices and communication media in the form of computer executable instructions or other data structures.

Finally, the Engagement Predictor described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Engagement Predictor has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Engagement Predictor. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented process performed by a computing device, comprising:
   receiving arbitrary content selected by a particular user and rendering that content to a display device;
   automatically identifying and extracting a plurality of candidate items from the arbitrary content, the candidate items comprising any combination of one or more words, phrases, sentences, images, audio, hyperlinks, and topics in the arbitrary content;
   predicting, for each of the plurality of the candidate items, a measure of interest with respect to the particular user, the measure of interest for each of the candidate items representing a statistical measure of a likelihood that the particular user will be interested in additional content related to the corresponding candidate item;
   the predicted measure of interest provided by any combination of one or more of a machine-learned topic model and a machine-learned transition model,
   the machine-learned topic model generated by applying machine-learning to automatically evaluate content of samples of source and destination documents using a generative model that posits a distribution over joint latent transition topics for each possible transition between the source and destination topics,
   the machine-learned transition model generated by applying machine-learning to train on observed transitions between pairs of source content and destination content, and any combination of features extracted from those pairs and joint latent transition topics for each possible transition between the source and destination documents;
   ranking the candidate items based on the predicted measure of interest for each candidate item;
   selecting a predetermined number of the highest ranked candidate items;
   associating additional content with the selected candidate items; and
   modifying the arbitrary content by automatically arranging and displaying the associated additional content on the display device in conjunction with the arbitrary content, thereby enabling the user to interact with both the arbitrary content and the associated additional content.

2. The computer-implemented process of claim 1, wherein a transition model predicts the measure of interest for each of the candidate items, and wherein the transition model is automatically generated by process actions comprising:
   receiving a collection of data points representing transitions between pairs of source content and destination content;
   extracting a plurality of features from each source content;
   extracting a plurality of features from each destination content; and
   the transition model configured to statistically explain why the transitions between pairs of source content and destination content were made.

3. The computer-implemented process of claim 2 wherein a generative model of the source and destination content that posits a distribution over joint latent features for each possible transition of the source and destination content is used to automatically learn the features that are then extracted from the source and destination content.

4. The computer-implemented process of claim 3 wherein one or more of the features learned by the generative model are latent semantic topics derived from the source and destination content.

5. The computer-implemented process of claim 2 wherein one or more of the extracted features are manually specified prior to being extracted.

6. The computer-implemented process of claim 1 wherein the measures of interest are applied to learn per-user profiles for personalizing one or more applications to corresponding users.

7. The computer-implemented process of claim 2 wherein the pairs of source content and destination content are identified from browser log data of a plurality of users.

8. A system for augmenting user selected documents, comprising:
a general purpose computing device; and
a computer program comprising program modules executable by the computing device, wherein the computing device is directed by the program modules of the computer program to:
automatically extract a plurality of candidate items from a user-selected document, the candidate items comprising any combination of one or more words, phrases, sentences, images, audio, hyperlinks, and topics in the user-selected document;
predict a separate user-specific interestingness score for each of the candidate items, the interestingness score for each of the candidate items representing a statistical measure of a likelihood that the user will be interested in additional content related to the corresponding candidate item;
the predicted user-specific interestingness score provided by any combination of one or more of a machine-learned topic model and a machine-learned transition model,
the machine-learned topic model generated by applying machine-learning to automatically evaluate content of samples of source and destination documents using a generative model that posits a distribution over joint latent transition topics for each possible transition between the source and destination topics,
the machine-learned transition model generated by applying machine-learning to train on observed transitions between pairs of source content and destination content, and any combination of features extracted from those pairs and joint latent transition topics for each possible transition between the source and destination documents;
sort the candidate items based on the corresponding interestingness scores;
select a predetermined number of the top sorted candidate items;
for each of the selected candidate items, associate the related additional content with the corresponding selected candidate items; and
modify the user-selected document by automatically arranging and displaying the associated related additional content on a display device in conjunction with the user-selected document, thereby enabling the user to interact with both the selected document and the corresponding associated related additional content.

9. The system of claim 8 further comprising program modules that direct the computing device to generate a transition model that predicts the interestingness score for each of the candidate items, and wherein the transition model is generated by:
receiving browser log data including transitions between pairs of source content and destination content;
automatically learn a plurality of features from a generative model of the source content and the destination content, the generative model representing each possible transition between the source content and the destination content;
extracting information corresponding to the learned features from the source content and the destination content; and
training on the extracted information and the learned features to automatically learn the transition model, the transition model statistically explaining why each possible transition between the source content and the destination content was made.

10. The computing device of claim 9 wherein one or more of the features learned by the generative model are latent semantic topics derived from the source and destination content.

11. The computing device of claim 9 wherein one or more of the features extracted from the source content and destination content are manually specified.

12. The computing device of claim 8 further directed by the program modules of the computer program to learn, based on the interestingness scores, user-specific profiles for personalizing one or more applications.

13. The computing device of claim 8 wherein the associated related additional content includes one or more advertisements.

14. A computer-readable storage device having computer executable instructions stored therein, said instructions causing a computing device to execute a method comprising:
rendering, on a display device, a user selected document;
automatically extracting a plurality of candidate items from a user selected document, the candidate items comprising any combination of one or more words, phrases, sentences, images, audio, hyperlinks, and topics in the user selected document;
predicting a measure of interest for each of a plurality of the candidate items with respect to the user, the measure of interest for each of the candidate items representing a statistical measure of a likelihood that the user will be interested in additional content related to the corresponding candidate item;
the predicted measure of interest provided by any combination of one or more of a machine-learned topic model and a machine-learned transition model,
the machine-learned topic model generated by applying machine-learning to automatically evaluate content of samples of source and destination documents using a generative model that posits a distribution over joint latent transition topics for each possible transition between the source and destination topics,
the transition model generated by applying machine-learning to train on observed transitions between pairs of source content and destination content, and any combination of features extracted from those pairs and joint latent transition topics for each possible transition between the source and destination documents;

ranking the candidate items based on the predicted measure of interest for each candidate item;
responsive to the predicted measures of interest, selecting one or more of the highest ranked candidate items;
associating additional content with the selected candidate items; and
modifying the user-selected document by automatically arranging and displaying the associated additional related content on the display device in conjunction with the user-selected document.

15. The computer-readable storage device of claim 14, the prediction of the measure of interest for each of the plurality items further comprising computer executable instructions comprising:
receiving transition data for a plurality of pairs of source content and destination content;
automatically learn a plurality of features from each of a plurality of possible transitions between the source content and the destination content;
extracting information corresponding to the learned features from the source content and the destination content; and
training the transition model on the extracted information and the corresponding learned features such that the transition model statistically explains why the transitions were made based on the extracted information and the corresponding learned features.

16. The computer-readable storage device of claim 15 wherein one or more of the learned features are latent semantic topics derived from the source and destination content.

17. The computer-readable storage device of claim 15 wherein one or more of the features extracted from the source content and destination content are manually specified.

18. The computer-readable storage device of claim 14 further comprising learning, from the predicted measures of interest, user-specific profiles for personalizing one or more applications.

19. The computer-readable storage device of claim 14 wherein one or more of the items of the additional related content includes one or more advertisements.

20. The computer-readable storage device of claim 15 wherein the pairs of source content and destination content are identified from browser log data.

* * * * *